(12) United States Patent
Derrick et al.

(10) Patent No.: US 11,697,663 B2
(45) Date of Patent: Jul. 11, 2023

(54) METAL-LIGAND CATALYSTS FOR SELECTIVE PROMOTION OF ELECTROCHEMICAL $CO_2RR$

(71) Applicant: THE REGENTS OF THE UNIVERSITY OF CALIFORNIA, Oakland, CA (US)

(72) Inventors: Jeffrey S. Derrick, Oakland, CA (US); Matthias Loipersberger, Berkeley, CA (US); Jeffrey R. Long, Lafayette, CA (US); Martin Head-Gordon, Berkeley, CA (US); Christopher J. Chang, Lafayette, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 236 days.

(21) Appl. No.: 17/164,281

(22) Filed: Feb. 1, 2021

(65) Prior Publication Data
US 2021/0238212 A1 Aug. 5, 2021

Related U.S. Application Data

(60) Provisional application No. 62/968,359, filed on Jan. 31, 2020.

(51) Int. Cl.
C07F 15/02 (2006.01)
B01J 31/18 (2006.01)
C25B 3/26 (2021.01)

(52) U.S. Cl.
CPC .......... *C07F 15/025* (2013.01); *B01J 31/183* (2013.01); *B01J 31/1815* (2013.01); *C25B 3/26* (2021.01)

(58) Field of Classification Search
None
See application file for complete search history.

(56) References Cited

PUBLICATIONS

Benson, Eric E. et al., "The Electronic States of Rhenium Bipyridyl Electrocatalysts for CO2 Reduction as Revealed by X-ray Absorption Spectroscopy and Computational Quantum Chemistry", Angew. Chem. Int. Ed. 2013, 52, pp. 4841-4844.
Chen, Zuofeng et al., "Electrocatalytic reduction of CO2 to CO by polypyridyl ruthenium complexes", Chem. Commun., 2011, 47, pp. 12607-12609.

(Continued)

*Primary Examiner* — Wojciech Haske
(74) *Attorney, Agent, or Firm* — O'Banion & Ritchey LLP; John P. O'Banion

(57) ABSTRACT

The electrochemical carbon dioxide reduction reaction ($CO_2RR$) provides opportunities to synthesize value-added products from this greenhouse gas in a sustainable manner. Efficient catalysts for this reaction are provided that selectively drive $CO_2$ reduction over the thermodynamic and kinetically competitive hydrogen evolution reaction (HER) in organic or aqueous electrolytes. The catalysts are metal-polypyridyl coordination complexes of a redox non-innocent terpyridine-based pentapyridine ligand and a first-row transition metal. The metal-ligand cooperativity in [Fe(tpyPY2Me)]$^{2+}$ drives the electrochemical reduction of $CO_2$ to CO at low overpotentials with high selectivity for $CO_2RR$ (>90%).

6 Claims, 14 Drawing Sheets

(56) References Cited

PUBLICATIONS

Clark, Melissa L. et al., "Kinetic and Mechanistic Effects of Bipyridine (bpy) Substituent, Labile Ligand, and Brønsted Acid on Electrocatalytic CO2 Reduction by Re(bpy) Complexes", ACS Catal, 2018, 8, pp. 2021-2029.

Dey, Subal et al., "Mononuclear iron hydrogenase", Coordination Chemistry Reviews, 257, (2013), pp. 42-63.

Diercks, Christian S. et al., "Reticular Electronic Tuning of Porphyrin Active Sites in Covalent Organic Frameworks for Electrocatalytic Carbon Dioxide Reduction", J. Am. Chem. Soc. 2018, 140, pp. 1116-1122.

Eisenberg, Richard et al., "Noninnocence in Metal Complexes: A Dithiolene Dawn" 2011 American Chemical Society, dx.doi.org/10.1021/ic2011748 | Inorg. Chem. 2011, 50, pp. 9741-9751.

Gonell, Sergio et al., "An Iron Pyridyl-Carbene Electrocatalyst for Low Overpotential CO2 Reduction to CO", 2020 American Chemical Society, ACS Catal. 2021, 11, pp. 615-626.

Gonell, Sergio et al., "Kinetics of the Trans Effect in Ruthenium Complexes Provide Insight into the Factors That Control Activity and Stability in CO2 Electroreduction", J. Am Chem. Soc. 2020, 142, pp. 8980-8999.

Gonell, Sergio et al., "The Trans Effect in Electrocatalytic CO2 Reduction: Mechanistic Studies of Asymmetric Ruthenium Pyridyl-Carbene Catalysts", J Am. Chem. Soc. 2019, 141, pp. 6658-6671.

Hawecker, Jeannot et al., "Electrocatalytic Reduction of Carbon Dioxide Mediated by Re(bipy)(CO)&I (bipy = 2,2'-pipyridine)", J. Chem. Soc., Chem Commun., 1984, pp. 328-330.

Derrick, Jeffrey S. et al., "Metal-Ligand Cooperativity via Exchange Coupling Promotes Iron-Catalyzed Electrochemical CO2 Reduction at Low Overpotentials", J. Am. Chem. Soc 2020, 142, pp. 20489-20501.

Jurss, Jonah W. et al., "Bioinspired design of redox-active ligands for multielectron catalysis: effects of positioning pyrazine reservoirs on cobalt for electro- and photocatalytic generation of hydrogen from water", Chem. Sci., 2015, 6, pp. 4954-4972.

Karunadasa, Hemamala I. et al., "A Molecular MoS2 Edge Site Mimic for Catalytic Hydrogen Generation", Feb. 10, 2012 vol. 335 Science www.sciencemag.org, pp. 698-703.

Keith, John A. et al., "Elucidation of the Selectivity of Proton-Dependent Electrocatalytic CO2 Reduction by fac-Re (bpy)(CO)3Cl", dx.doi.org/10.1021/ja406456g J. Am. Chem. Soc. 2013, 135, pp. 15823-15829.

Letko, Christopher S. et al., "Mechanism of the Electrocatalytic Reduction of Protons with Diaryldithiolene Cobalt Complexes", dx.doi.org/10.1021/ja5019755 J. Am. Chem. Soc. 2014, 136, pp. 9364-9376.

Li, Ting-Ting et al., "Electrocatalytic CO2 Reduction with a Ruthenium Catalyst in Solution and on Nanocrystalline TiO2", ChemSusChem 2019, 12, pp. 2402-2408.

Lin, Song et al., "Covalent organic frameworks comprising cobalt porphyrins for catalytic CO2 reduction in water", sciencemag.org Science, Sep. 11, 2015, vol. 349, issue 6253, pp. 1208-1214.

Liu, Yanming et al., "Steering CO2 electroreduction toward ethanol production by a surface-bound Ru polypyridyl carbene catalyst on N-doped porous carbon", PNAS, Dec. 26, 2019, vol. 116, No. 52, pp. 26353-26358.

McNamara, William R. et al., "Cobalt-dithiolene complexes for the photocatalytic and electrocatalytic reduction of protons in aqueous solutions", PNAS, Sep. 25, 2012, vol. 109, No. 39, pp. 15594-15599.

McNamara, William R. et al., "A Cobalt Dithiolene Complex for the Photocatalytic and Electrocatalytic Reduction of Protons", dx.doi.org/10.1021/ja207842r, J. Am. Chem. Soc. 2011, 133, pp. 15368-15371.

Karunadasa, Hemamala I. et al., "A Molecular MoS2 Edge Site Mimic for Catalytic Hydrogen Generation", Feb. 10, 2012, vol. 335, Science, pp. 698-703.

Nichols, Eva M. et al., "Positional effects of second-sphere amide pendants on electrochemical CO2 reduction catalyzed by iron porphyrins", Chem. Sci, 2018, 9, pp. 2952-2960.

Proppe, Andrew H. et al., "Bioinspiration in light harvesting and catalysis", 828, Nov. 2020, vol. 5, pp. 828-846.

Smieja, Jonathan M., "Re(bipy-tBu)(CO)3Cl-improved Catalytic Activity for Reduction of Carbon Dioxide: IR-Spectroelectrochemical and Mechanistic Studies", Inorg. Chem. 2010,4 9, pp. 9283-9289.

Smith, Peter T. et al., "Hybrid Catalysts for Artificial Photosynthesis: Merging Approaches from Molecular, Materials, and Biological Catalysis", Acc. Chem. Res. 2020, 53, pp. 575-587.

Smith, Peter T. et al., "An NADH-Inspired Redox Mediator Strategy to Promote Second-Sphere Electron and Proton Transfer for Cooperative Electrochemical CO2 Reduction Catalyzed by Iron Porphyrin", Inorg. Chem. 2020, 59, pp. 9270-9278.

Su, Xiaojun et al., "Robust and Selective Cobalt Catalysts Bearing Redox-Active Bipyridyl-N-heterocyclic Carbene Frameworks for Electrochemical CO2 Reduction in Aqueous Solutions", ACS Catal. 2019, 9, pp. 7398-7408.

Su, Xiaojun et al., "Electrocatalytic CO2 reduction with nickel complexes supported by tunable bipyridyl-N-heterocyclic carbene donors: understanding redox-active macrocycles", Chem. Commun. 2018, 54, pp. 3351-3354.

Sun, Yujie et al., "Molecular Cobalt Pentapyridine Catalysts for Generating Hydrogen from Water", dx.doi.org/10.1021/ja202743r, J. Am. Chem. Soc. 2011, 133, pp. 9212-9215.

Wu, Yueshen et al., "Electroreduction of CO2 Catalyzed by a Heterogenized Zn-Porphyrin Complex with a Redox-Innocent Metal Center", ACS Cent. Sci. 2017, 3, pp. 847-852.

Zee, David Z. et al., "Metal-Polypyridyl Catalysts for Electro- and Photochemical Reduction of Water to Hydrogen", Acc. Chem. Res. 2015, 48, pp. 2027-2036.

METAL-LIGAND CATALYSTS FOR SELECTIVE PROMOTION OF ELECTROCHEMICAL CO$_2$RR

CROSS-REFERENCE TO RELATED APPLICATIONS

This application claims priority to, and the benefit of, U.S. provisional patent application Ser. No. 62/968,359 filed on Jan. 31, 2020, incorporated herein by reference in its entirety.

STATEMENT REGARDING FEDERALLY SPONSORED RESEARCH OR DEVELOPMENT

This invention was made with government support under Contract No. DE-AC02-05CH11231 awarded by the U.S. Department of Energy. The government has certain rights in the invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to catalysts for electrochemical CO$_2$ reduction and more particularly to compositions and methods for electrochemical carbon dioxide reduction reaction (CO$_2$RR) that maximize selectivity for CO$_2$ reduction over hydrogen by suppressing metal-centered reductions that limit the formation of off-pathway metal hydride intermediates that are necessary for hydrogen evolution and thereby favor CO$_2$ reduction catalysis.

2. Background

Carbon dioxide generated from the combustion of fossil fuels for heat and electricity production is a major contributor to climate change and ocean acidification. To mitigate the effects of rising atmospheric CO$_2$ levels related to the burning of fossil fuels, various strategies have been developed to control and capture CO$_2$ emissions. Typical capture or scrubbing processes are centered on reactions with aqueous amines to remove carbon dioxide. However, industrial systems that use aqueous amines to separate CO$_2$ from gas mixtures with high CO$_2$ partial pressures often have significant solvent loss and corrosion issues from the use of aqueous amines.

Advanced solid adsorbents also have the potential to significantly decrease the cost of CO$_2$ removal from the effluent streams of fossil fuel-burning power plants and other sources. Solid adsorbents, including zeolites, activated carbons, silicas, and metal-organic frameworks, have received significant attention as alternatives to amine solutions, demonstrating high CO$_2$ capacities and high selectivity for CO$_2$ over N$_2$, together with reduced regeneration energy penalties.

The electrochemical carbon dioxide reduction reaction (CO$_2$RR) provides opportunities to synthesize value-added products from this greenhouse gas in a sustainable manner. However, the development of efficient catalysts for this reaction are required to selectively drive CO$_2$ reduction over the thermodynamic and kinetically competitive hydrogen evolution reaction (HER).

Biological heterogeneous, and molecular catalysts have been studied for their capacity for CO$_2$ reduction. Molecular systems offer several potential advantages such as their small size relative to enzymes and the fact that they can be tuned with a level of atomic precision that is inaccessible with heterogeneous materials. However, despite advances in the development of molecular catalysts with highly specialized ligand scaffolds, including cyclams, porphyrins and phthalocyanines, and tricarbonyl-bipyridines, it remains a challenge to design molecules that exhibit low overpotentials, high turnover numbers, and provide compatibility with aqueous electrolytes to avoid off-pathway HER processes.

In this regard, one key advantage of biological and heterogeneous catalysts is their ability to minimize overpotential and maximize selectivity for CO$_2$ reduction via electronic delocalization, either through electron-tunneling pathways or a high local density of states, respectively. Such systems can thereby achieve organization and separation of reducing equivalents in a way that is challenging to design in molecular systems.

Biological and heterogenous catalysts for electrochemical CO$_2$ reduction often exhibit a high degree of electronic delocalization that serves to minimize overpotential and maximize reaction selectivity over competing hydrogen evolution reaction pathways. Incorporation of these concepts into a discrete molecular system represents a major challenge. Accordingly, there is a need for new electrocatalysts that are efficient, inexpensive to produce and selectively drive CO$_2$ reduction over the thermodynamic and kinetically competitive hydrogen evolution reaction (HER).

BRIEF SUMMARY

Catalyst compositions with a new ligand framework that incorporates a redox-active terpyridine moiety into a modular polypyridyl scaffold are provided that can achieve highly selective and efficient metal-catalyzed electrochemical CO$_2$ reduction to CO in both organic and aqueous solutions with high specificity over competing hydrogen evolution pathways. Importantly, the combination of both an open-shell metal ion using an earth abundant, first-row transition metal in conjunction with a redox non-innocent ligand enables metal-cooperativity through strong exchange coupling that shifts electrochemical reduction potentials to promote CO$_2$RR catalysis.

The electrocatalytic compositions are illustrated with an iron polypyridine complex [Fe(tpyPY2Me)(CH$_3$CN)]$^{2+}$ (tpyPY2Me=6-(1,1-di(pyridin-2-yl)ethyl)-2,2':6',2"-terpyridine), which features a redox-active terpyridine fragment and illustrates the principle of electronic delocalization in a molecule. The strong exchange coupling between the redox-active tpyPY2Me ligand and iron(II) center promotes electrochemical reduction of CO$_2$ to CO at low overpotentials with very high selectivity and turnover frequencies.

Synthetic reduction of the complex enables access to the catalytically active species [Fe(tpyPY2Me)]$^0$, which exhibits an unusual open-shell singlet ground state comprised of an intermediate-spin iron(II) ($S_{Fe}$=1) antiferromagnetically coupled to a doubly reduced triplet terpyridine ligand ($S_{tpy}$=1). Significantly, this unique electronic structure also enables this catalyst to operate in water with a high selectivity for $CO_2$ reduction over the hydrogen evolution reaction.

Catalysts with a molecular iron(II) complex for electrochemical $CO_2$ reduction, exhibit a high degree of electronic delocalization as a result of strong metal-ligand exchange coupling that serves to minimize overpotential and maximize reaction selectivity over competing hydrogen evolution reaction pathways. The interaction promotes an open-shell singlet electronic structure that drives the electrochemical reduction of $CO_2$ to CO with over 90% selectivity and turnover frequencies of $100,000^{s-1}$ at low overpotentials, with no degradation over 20 hours. The decrease in the thermodynamic barrier produced by this strong metal-ligand exchange coupling enables homogeneous $CO_2$ reduction catalysis in water without compromising reaction selectivity.

It has been observed that, the Fe(II) tpyPYMe$_2$ analog exhibits a 640 mV positive shift in the 2-electron reduction potential relative to the isostructural analog bearing a redox-silent Zn(II) center, poising it for multielectron electrocatalysis with minimized overpotentials. Control experiments with Fe(II) and Zn(II) complexes bearing a related pentapyridine ligand lacking the redox-active terpyridine fragment and the same redox non-innocent ligand but with a redox-silent Zn(II) center show that $CO_2$RR relies on synergistic coupling between both metal and ligand components.

The combination of distorted coordination geometry, low lying $\pi^*$ orbitals, and moderate ligand field that is provided by the rigid, redox non-innocent tpyPY2Me ligand promotes strong metal-ligand cooperativity with the iron(II) center. [Fe1]$^{2+}$ was shown to catalyze $CO_2$ reduction at extremely mild redox potentials ($\eta$=190 mV; −1.46 V vs Fc/Fc$^+$) relative to the control polypyridyl complexes.

The positive redox potentials of the $CO_2$RR catalysis have been interpreted with reference to experimental spectroscopic (NMR, Mössbauer, and XAS), XRD, and electrochemical studies, along with electronic structure calculations, which collectively point to a model in which the two-electron reduced iron complex, [Fe1]$^0$, possesses an open-shell singlet ground state electronic structure ([Fe(tpyPY2Me$^{••}$)$^{2-}$]$^0$ resulting from a strong intramolecular antiferromagnetic coupling between a triplet reduced ligand (tpyPY2Me tpyPY2Me$^{••2-}$; StpyPY2Me=1) and an intermediate-spin Fe(II) center ($S_{Fe}$=1).

The ability to create molecular compounds with strong exchange coupling between synergistic, redox non-innocent ligands and metal centers has broad implications for catalyst design, including enabling control over the density and arrangement of functional active sites. Indeed, redox balancing through electronic delocalization is pivotal for biological and materials catalysts to achieve complex chemical transformations at or near thermodynamic potentials. However, discrete molecular compounds offer a level of tunability via coordination chemistry that remains unparalleled in protein design and nanostructure engineering. Thus, inorganic molecules are uniquely positioned to open access to a range of new properties and offer a desirable alternative strategy for lowering energy barriers for redox catalysis. The observed 640 mV electrochemical potential shift and associated turn-on of $CO_2$RR catalysis upon substituting Zn(II) for Fe(II) for the same redox non-innocent ligand emphasizes metal-ligand cooperativity for redox balancing that goes beyond redox activity dominated at either ligand or metal sites alone.

According to one aspect of the technology, catalysts are provided that selectively drive $CO_2$ reduction $CO_2$RR over the HER reaction.

Another aspect of the technology is to provide a tunable catalyst system with the use of molecular iron(II) and a redox non-innocent terpyridine-based pentapyridine ligand (tpyPY2Me).

Another aspect of the technology is to provide a catalyst and redox catalyst system that reduces $CO_2$ in an organic or aqueous environment with low overpotentials.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Figure 1:
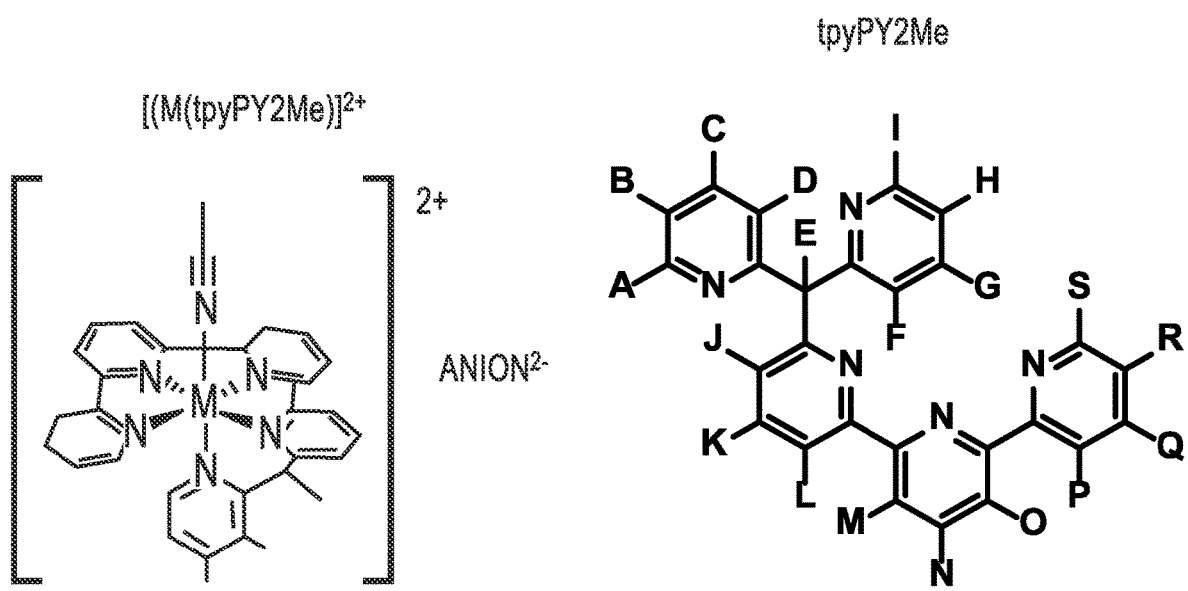
FIG. 1 is a schematic chemical structure diagram generally depicting a molecular $CO_2$ reduction catalyst [(M(tpyPY2Me)]$^{2+}$, termed ([Fe1]$^{2+}$), according to one embodiment of the technology.

Referring more specifically to the drawings, for illustrative purposes, compositions and methods for catalyzing the electrochemical carbon dioxide reduction reaction (CO$_2$RR) while minimizing overpotentials and favor CO$_2$RR over competing HER pathways are generally shown. Several embodiments of the technology are described generally in FIG. 1 to FIG. 12B to illustrate the compositions and functionality of the catalysts, synthesis protocols and methods of use. It will be appreciated that the methods may vary as to the specific steps and sequence and the compositions and systems may vary as to structural details without departing from the basic concepts as disclosed herein. The method steps are merely exemplary of the order that these steps may occur. The steps may occur in any order that is desired, such that it still performs the goals of the claimed technology.

Biological and heterogenous catalysts for the electrochemical CO$_2$ Reduction Reaction (CO$_2$RR) often exhibit a high degree of electronic delocalization that serves to minimize overpotential and maximize selectivity over the competing hydrogen evolution reaction (HER). The present technology provides a catalyst with a molecular iron(II) system that mimics the concepts in a homogeneous setting through the use of a redox non-innocent terpyridine-based pentapyridine ligand (tpyPY2Me) where (tpyPY2Me=6-(1, I-di(pyridin-2-yl)ethyl)-2,2':6',2''-terpyridine). As a result of the strong metal-ligand exchange coupling between the Fe(II) center and the ligand, [Fe(tpyPY2Me)]$^{2+}$ exhibits redox behavior at potentials 640 mV more positive than the isostructural [Zn(tpyPY2Me)]$^{2+}$ analog containing the redox-inactive Zn(II) ion. This shift in redox potential is attributed to the requirement for both an open-shell metal ion and a redox non-innocent ligand. The metal-ligand cooperativity in [Fe(tpyPY2Me)]$^{2+}$ drives the electrochemical reduction of CO$_2$ to CO at low overpotentials with high selectivity (>90%) for CO$_2$RR over HER and turnover frequencies of 100,000 per second with no degradation over a period of 20 hours. This electronic structure enables the molecular catalyst to operate at low overpotentials in both organic and neutral aqueous electrolytes, resulting in high selectivity for CO$_2$RR over HER without compromising selectivity or reaction rates.

Synthesis of the two-electron reduction product, [Fe (tpyPY2Me)]$^0$, and characterization by X-ray crystallography, Mössbauer spectroscopy, X-ray absorption spectroscopy (XAS), variable temperature NMR, and density functional theory (DFT) calculations, support assignment of an open-shell singlet electronic structure that maintains a formal Fe(II) oxidation state with a doubly reduced ligand system. This provides a starting point for the design of systems that exploit metal-ligand cooperativity for electrocatalysis where the electrochemical potential of redox non-innocent ligands can be tuned through secondary metal-dependent interactions.

Figure 2:
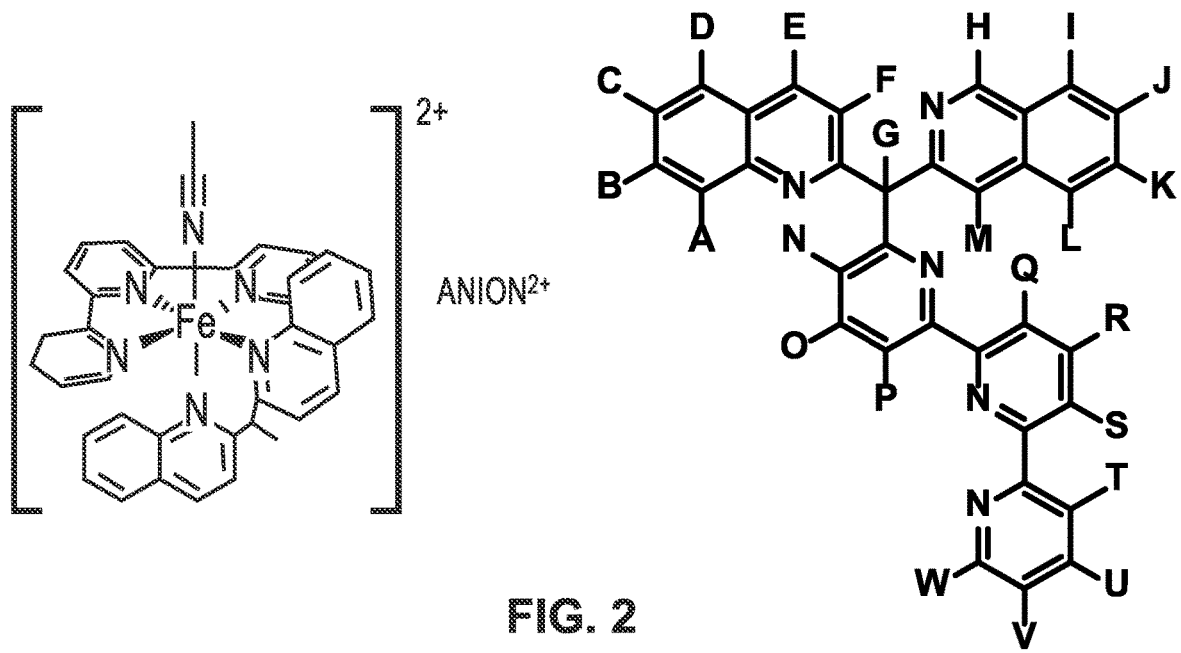
FIG. 2 is a schematic chemical structure diagram generally depicting a molecular $CO_2$ reduction catalyst ([Fe2]$^{2+}$) according to an alternative embodiment of the technology.

Turning now to FIG. 1 and FIG. 2, embodiments of the catalyst composition for CO$_2$RR favored catalysis is shown schematically. In the embodiment of FIG. 1, the catalyst composition 10 has the general formula (M(tpyPY2Me)]$^{2+}$ wherein tpyPY2Me refers to the generalized ligand structures shown on the left (for clarity) and M is a transition metal. The iron polypyridine complex [Fe(tpyPY2Me) (CH$_3$CN)]$^{2+}$ (tpyPY2Me=6-(1, I-di(pyridin-2-yl)ethyl)-2,2': 6',2''-terpyridine) is used to illustrate the functionality of the compositions. This complex is referred to as [Fe1]$^{2+}$ or formula (1).

An alternative polypyridyl metal ligand complex for electrochemical carbon dioxide reduction catalysis is shown in FIG. 2. This complex is referred to as [Fe2]$^{2+}$ or formula (2). This electronic structure also enables the molecular catalyst to operate at low overpotentials in both organic and neutral aqueous electrolytes, resulting in high selectivity for CO$_2$RR over HER.

Unless defined otherwise, all technical and scientific terms used herein have the same meaning as commonly understood by one of ordinary skill in the art to which this invention is related. The following terms are defined for purposes of the technology as described herein.

The substituents at positions A to S of both the compositions of formula (1) and formula (2) can be H, R, a halide, $CF_3$, OR, $NR_2$, or $SiR_3$, where R can be an alkyl group or an aryl group. The term "alkyl" as used herein refers to a saturated hydrocarbon having from 1 to 10 carbon atoms (i.e., $C_1$-$C_{10}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). The alkyl group may be linear, branched or cyclic and is intended to embrace all structural isomeric forms of an alkyl group. Examples of saturated hydrocarbon groups include, but are not limited to, groups such as methyl, ethyl, n-propyl, isopropyl, n-butyl, t-butyl, isobutyl, sec-butyl, pentyl, hexyl and cyclohexyl etc. In addition, the term "alkyl" as used herein further includes one or more substitutions at one or more carbon atoms of the hydrocarbon chain structure.

The term "aryl" as used herein refers to any monocyclic or polycyclic cyclized carbon structure containing 6 to 14 carbon ring atoms, wherein at least one ring is an aromatic hydrocarbon. The aryl ring can be a monocyclic, bicyclic, tricyclic and the like. In addition, the term "aryl" as used herein further includes an aryl group where a ring carbon atom (or two or three ring carbon atoms) have been replaced with a heteroatom, preferably N, O, or S.

The term "metal" refers to first row transition metals (Sc, Ti, V, Cr, Mn, Fe, Co, Ni, Cu, and Zn), with iron particularly preferred and Fe and Zn are used to illustrate the catalyst structural and functional features.

The term "counter ion" or "anion" as used herein refers to any moiety or group bearing a negative charge. The preferred counter ions or anions for the complex of formula (1) and formula (2) can be selected from the following group: Cl, Br, I, $PF_6$, $CF_3SO_3$, and $[(3,5-(CF_3)_2C_6H_3)_4B]$. Although these counter ions are preferred, it will be seen that other ions may be used.

The term "aqueous solution" as used herein refers to a solution that is predominantly water and retains the solution characteristics of water. The term also includes aqueous solution that contains solvents in addition to water, although water is the predominant solvent. The term "organic solution" as used herein refers to a solution containing one or more conventional liquid organic-solvent-based electrolytes. However, tetraalkylammonium salts such as tetrabutylammonium hexafluorophosphate ($TBAPF_6$) dissolved in $CH_3CN$ are particularly preferred electrolytes.

Figure 3:
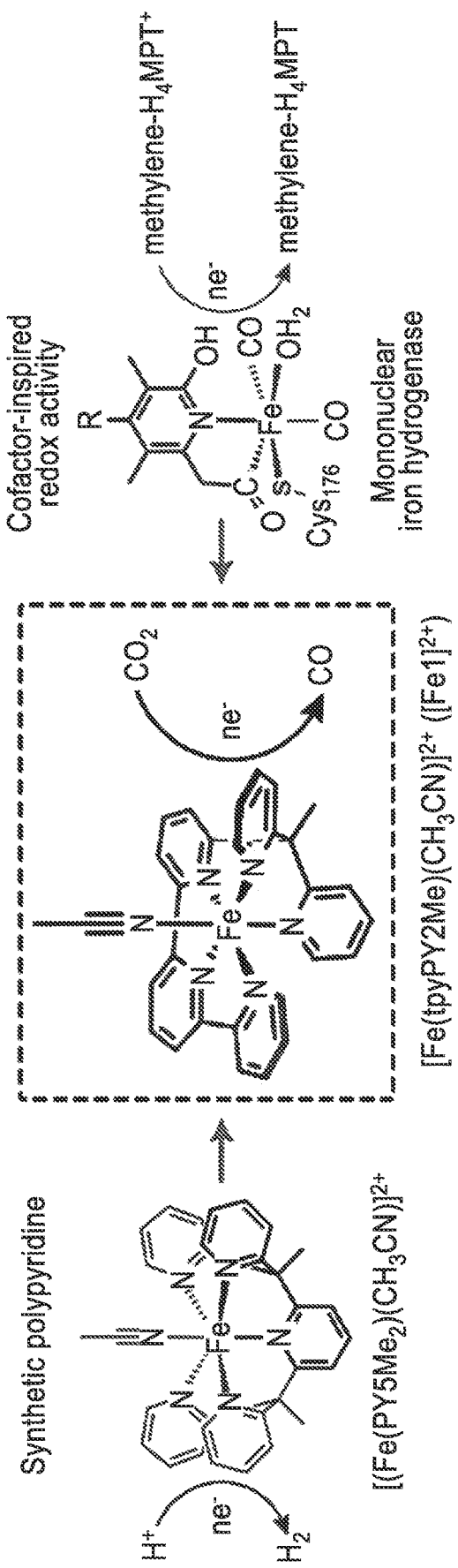
FIG. 3 depicts the bioinspired design of a molecular iron polypyridyl complex for electrochemical carbon dioxide reduction catalysis [Fe1]$^{2+}$ (center) that was designed to feature a mononuclear iron center supported by a redox-active pendant in a robust synthetic polypyridyl scaffold (left), inspired by the active site of mononuclear iron hydrogenase shown to the (right).

As shown in FIG. 3, the molecular $CO_2$ reduction catalyst [Fe1]$^{2+}$ was designed to feature a mononuclear iron center supported by a redox-active pendant in a robust synthetic polypyridyl scaffold (left) that mimics the active site of mononuclear iron hydrogenase (right). The iron polypyridine complex [Fe(tpyPY2Me)($CH_3CN$)]$^{2+}$ (i.e. [Fe1]$^{2+}$) features a redox-active terpyridine fragment and demonstrates electronic delocalization. In particular, metal-ligand cooperativity promotes strong exchange coupling between the redox-active tpyPY2Me ligand and iron(II) center where the [Fe(tpyPY2Me)]$^{2+}$ complex is able to accept two electrons at suitable reduction potentials. Upon two-electron reduction of [Fe(tpyPY2Me)]$^{2+}$, strong antiferromagnetic coupling facilitates electrocatalytic reduction of $CO_2$ to CO at low overpotentials.

Synthesis of the two-electron reduction product, [Fe(tpyPY2Me)]$^0$, and characterization by X-ray crystallography, Mössbauer spectroscopy, X-ray absorption spectroscopy (XAS), variable temperature NMR, and density functional theory (DFT) calculations, support assignment of an open-shell singlet electronic structure that maintains a formal Fe(II) oxidation state with a doubly reduced ligand system. This provides a starting point for the design of systems that exploit metal-ligand cooperativity for electrocatalysis where the electrochemical potential of redox non-innocent ligands can be tuned through secondary metal-dependent interactions.

To illustrate and characterize the catalysts, the tpyPY2Me ligand and corresponding iron(II) complex [Fe(tpyPY2Me)]$^{2+}$ (abbreviated as [Fe1]$^{2+}$) were prepared and evaluated. The design and synthesis of [Fe1]$^{2+}$ catalysts and their structural and functional characterization are illustrated further in the Examples below. Briefly, the pentapyridine ligand tpyPY2Me bearing a redox non-innocent terpyridine fragment was formed by a lithium-mediated coupling between 6-bromo-2,2'6',2"-terpyridine and 2,2'-(ethane-1,1-diyl)dipyridine as illustrated in Example 1.

A series of control coordination complexes were synthesized and evaluated to disentangle the contributions of the redox-active ligand from the metal center. The chemical structures of [Fe1]$^{2+}$ embodiment and the coordination complexes used as controls to evaluate the contributions of the ligand and the metal center in catalysis are shown in FIG. 4A through FIG. 4D.

Figures 4A, 4B, 4C, 4D:
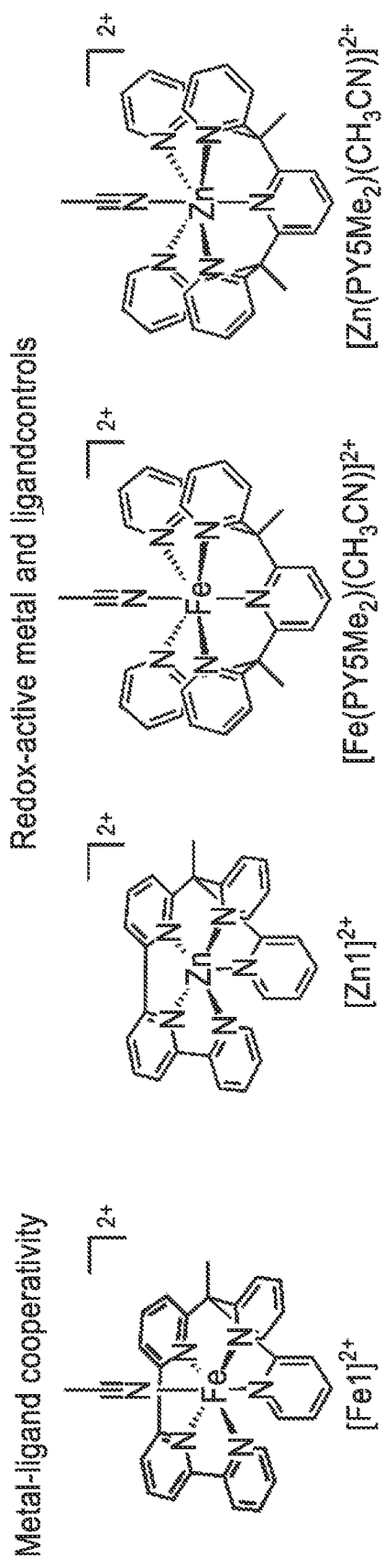
FIG. 4A depicts the chemical structure of [Fe1]$^{2+}$ highlighting cooperativity between the open-shell iron center and redox non-innocent tpyPY2Me ligand.
FIG. 4B depicts the chemical structure of a diamagnetic analog containing the redox-silent Zn(II) center, [Zn1]$^{2+}$, which enabled the role of the iron center to be probed with the same redox non-innocent ligand scaffold.
FIG. 4C depicts the chemical structure of [Fe(PY5Me$_2$)(CH$_3$CN)]$^{2+}$ that features the redox-innocent PY5Me2 as a related pentapyridine ligand that aids in the identification of the contributions of the redox-active terpyridine fragment within the polypyridyl scaffold.
FIG. 4D depicts the chemical structure of Zn(PY5Me$_2$)(CH$_3$CN)]$^{2+}$ The coordination complexes of FIG. 4A to FIG. 4D are used as controls to disentangle the contributions of the ligand and the metal center in catalysis.

In order to decipher the role of the iron center in electrochemical behavior and subsequent catalysis, the diamagnetic, isostructural zinc(II) analog [Zn-(tpyPY2Me)]$^{2+}$ ([Zn1]$^{2+}$) was prepared that is equipped with the same redox-active tpyPY2Me ligand but with a redox-silent zinc center as shown in FIG. 4B. The [Zn1]$^{2+}$ diamagnetic analog containing the redox-silent Zn(II) center, enables the role of the iron center to be probed with the same redox non-innocent ligand scaffold.

To further aid in identifying the role of the redox-active terpyridine fragment of the polypyridyl scaffold, the complexes [Fe(PY5Me$_2$)-($CH_3CN$)]$^{2+}$ shown in FIG. 4C and the [Zn(PY5Me$_2$)($CH_3CN$)]$^{2+}$ shown in FIG. 4D were synthesized that bear the related pentapyridine PY5Me$_2$ ligand without the polypyridine conjugation. It was seen that irreversible reduction of the PY5Me$_2$ ligand occurs at very negative potentials (between −2.0 and −2.5 V vs Fc/Fc$^+$) and is coupled to catalyst decomposition and therefore serves as a polypyridyl redox-innocent ligand control.

Figure 5:
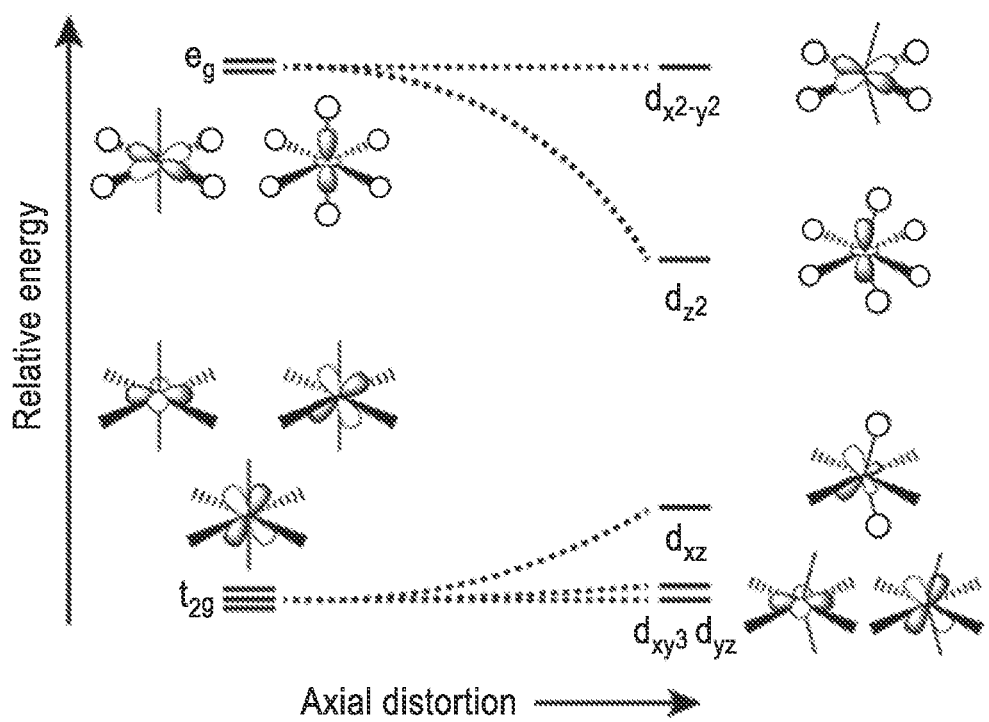
FIG. 5 is a simplified Walsh diagram illustrating the effect of axial distortion away from the near ideal $O_h$ symmetry in [Fe(PY5Me$_2$)-(CH$_3$CN)]$^{2+}$ toward the $C_{2v}$ symmetry in [Fe1]$^{2+}$.
Figure 6:
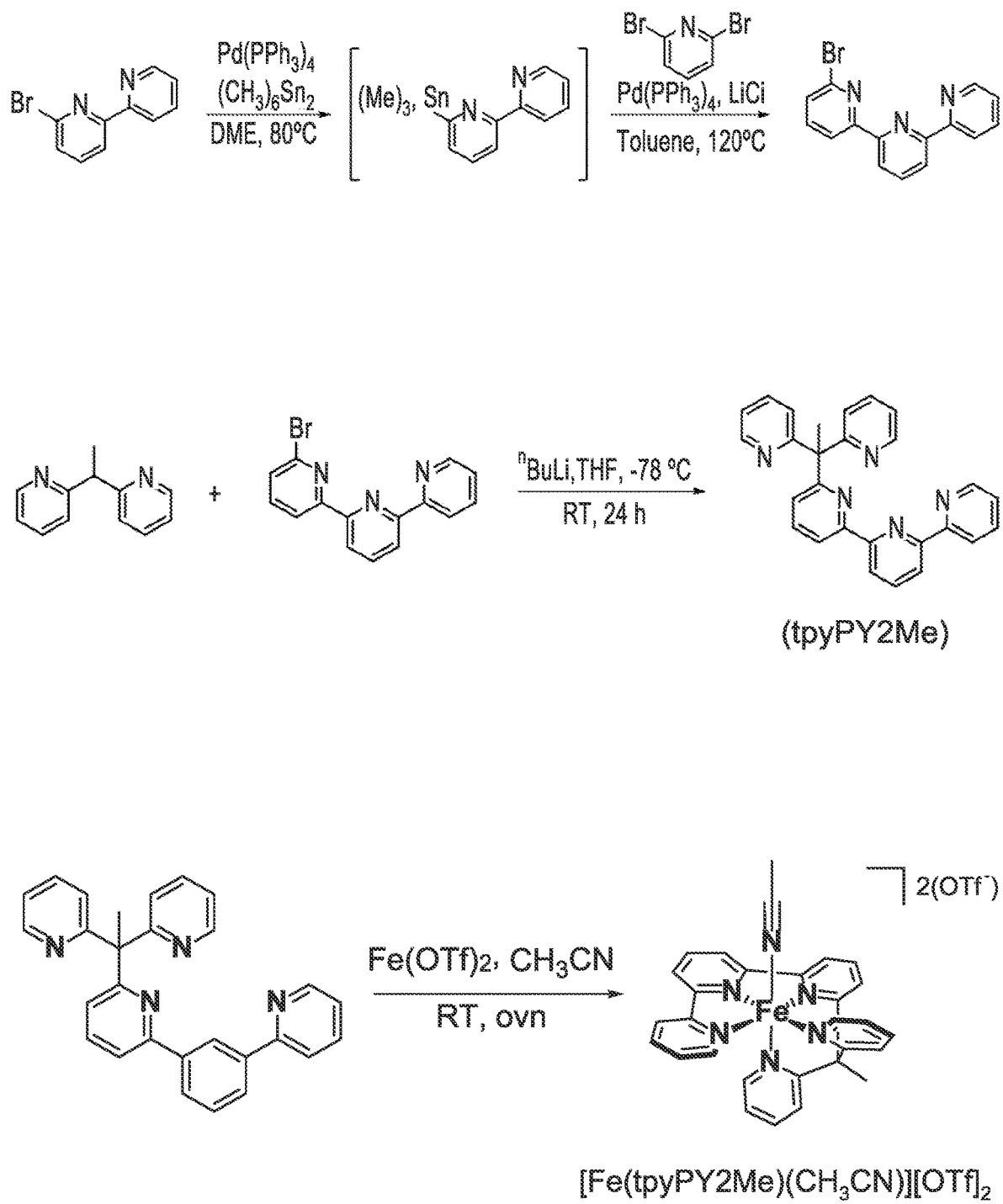
FIG. 6 is a flow diagram of a synthesis scheme for the preparation of the catalyst complex [Fe1]$^{2+}$ according to one embodiment of the technology.

Structural characterization of iron polypyridyl complexes was performed on [Fe(PY5Me$_2$)($CH_3CN$)]$^{2+}$, featuring the redox-innocent PY5Me$_2$ ligand, as well as [Fe1]$^{2+}$ by X-ray diffraction analysis. A simplified Walsh diagram illustrating the effect of axial distortion away from the near ideal $O_h$ symmetry in [Fe(PY5Me$_2$)-($CH_3CN$)]$^{2+}$ toward $C_{2v}$ symmetry in [Fe1]$^{2+}$ is shown in FIG. 5.

A comparison of the solid-state structures of [Fe1]$^{2+}$ and [Fe(PY5Me$_2$)($CH_3CN$)]$^{2+}$ obtained with single-crystal X-ray diffraction (XRD) revealed that the enhanced rigidity of the tpyPY2Me ligand enforces a more distorted pseudo-octahedral ($O_h$) geometry in [Fe1]$^{2+}$ relative to [Fe(PY5Me$_2$)-($CH_3CN$)]$^{2+}$, which adopts an almost ideal $O_h$ geometry. In particular, it was observed that the occupation of the iron equatorial plane by the three terpyridine nitrogen atoms and coordination of the pyridine arms to axial and equatorial positions induces severe axial distortions in [Fe1]$^{2+}$ that are absent in [Fe(PY5Me$_2$)($CH_3CN$)]$^{2+}$. This distortion also significantly compresses the axial bond angle in [Fe1]$^{2+}$ (173.64(6)°). By comparison, the corresponding angle in the [Fe(PY5Me$_2$)(CH$_3$CN)]$^{2+}$ material is nearly linear (178.53(7)°).

Distortion of the primary coordination sphere as a result of the enhanced ligand rigidity of tpyPY2Me was also observed in the control analog bearing the redox-silent Zn(II) center, [Zn1]$^{2+}$. Evaluation of the solid-state structure of [Zn1]$^{2+}$, shown generally in FIG. 4B, shows that tpyPY2Me enforces a severely distorted square pyramidal coordination geometry with the terpyridine nitrogen atoms occupying equatorial positions. This structure departs quite significantly from the O$_h$ geometry that is observed in [Zn(PY5Me$_2$)(CH$_3$CN)]$^{2+}$.

The structure of [Fe1]$^{2+}$ remains more distorted than that of [Fe(PY5Me$_2$)(CH$_3$CN)]$^{2+}$ in solution, as verified by $^1$H NMR spectra collected for both complexes in CD$_3$CN at 295 K. The $^1$H NMR spectrum of Fe(PY5Me$_2$)(CH$_3$CN)]$^{2+}$ features five sharp signals consistent with a C$_{2v}$ symmetric complex with lowspin Fe(II) (S=0), whereas the $^1$H NMR spectrum of [Fe1]$^{2+}$ features slightly more broadened resonances with no well-defined symmetry.

In comparison, the [Zn1]$^{2+}$ shows a $^1$H NMR spectrum with all expected ligand resonances accounted for, which is consistent with its diamagnetic ground state. Using the Evans method, an effective magnetic moment ($\mu_{eff}$) of 1.27$\mu_B$ for [Fe1]$^{2+}$ at 293 K was measured, which is indicative of a low-spin Fe(II) ground state (S=0) with a population of thermally accessible spin excited states at room temperature.

Because the [Fe1]$^{2+}$ bond lengths measured at 100 K are in agreement with those of other low-spin Fe(II) polypyridyl complexes, the collective data suggest that [Fe1]$^{2+}$ undergoes a spin-state transition between 100 K and room temperature. To further probe the spin-state transition of [Fe1]$^{2+}$, variable-temperature (VT)$^1$H NMR spectra were collected in CD$_3$CN across a temperature range of 233 K to 353 K. At 293 K, it was observed that resonances at 9.47, 7.73, 7.12, and 6.74 ppm appear as very broad singlets. Upon heating the sample to 353 K, these peaks become undetectable due to broadening into the baseline. Upon stepwise cooling, the resonances start to become fully resolved. At 233 K, integration of the aryl region accounts for the 18 proton signals that are expected for [Fe1]$^{2+}$. This temperature-dependent signal broadening is in line with an interpretation of a population of thermally accessible spin excited states.

Due to the absence of systematic, temperature dependent paramagnetic shifts of the [Fe1]$^{2+}$ resonances, it was not possible to quantify the spin equilibrium from the $^1$H NMR data alone. Nevertheless, the variable temperature Evans method data further revealed a gradual increase in $\mu_{eff}$ upon heating, in agreement with the occurrence of a spin transition process in solution.

Zero-field $^{57}$Fe Mössbauer spectra collected for [Fe1]$^{2+}$ at 5 K and 295 K further support such a spin state transition for the Fe(II) center. At 5 K, the spectrum features a symmetric Lorentzian doublet with isomer shift ($\delta$) and quadrupole splitting ($|\Delta E_Q|$) values of 0.3562(4) and 1.0203(8) mm/s, respectively, consistent with a low-spin iron(II). The density functional theory (DFT) computed Mössbauer parameters closely match the experimental values within the well-established uncertainty ranges (~0.10 mm/s for $\delta$ and ~0.3 mm/s for $\Delta E_Q$), thus corroborating the low-spin Fe(II) assignment.

In contrast, the Mössbauer spectrum measured at 295 K features an asymmetric quadrupole doublet that can be fit to two different iron sites. The parameters of the major site were nearly identical to the 5 K spectrum when accounting for second-order Doppler shifts (SODS) ($\delta$=0.285(1) mm/s, $|\Delta E_Q|$=1.056(2) mm/s) and are therefore consistent with the same low-spin Fe(II) species observed at 5 K. The isomer shift of the minor site is significantly more positive (0.62(1) mm/s) and is indicative of a higher spin iron(II) species. DFT predicted Mössbauer parameters for these higher-spin Fe(II) species correspond closely to the experimental values for the minor site measured at 295 K, further supporting the assignment.

The distinct iron(II) spin states in [Fe1]$^{2+}$ and [Fe(PY5Me$_2$)-(CH$_3$CN)]$^{2+}$ can be further understood from the simplified Walsh diagram presented in FIG. 5. It can be seen that Axial distortions engendered by the rigid tpyPY2Me ligand led to a decrease in symmetry from idealized O$_h$ to C$_{2v}$, and this distortion significantly stabilizes the d$_{z^2}$ orbital and destabilizes the d$_{xz}$ through z-component mixing of the t$_{1u}$ and t$_{2g}$ orbitals. The stabilization of the d$_{z^2}$ orbital and disruption of t$_{2g}$ degeneracy can then facilitate the formation of thermally accessible spin excited states near room temperature. The marked differences in the ground state electronic structures of [Fe1]$^{2+}$ and Fe(PY5Me$_2$)-(CH$_3$CN)]$^{2+}$ appear to contribute to their distinct electrochemical and catalytic behavior.

The combination of distorted coordination geometry, low lying π* orbitals, and moderate ligand field produced by the rigid, redox non-innocent tpyPY2Me ligand promotes strong metal-ligand cooperativity with the iron(II) center. The [Fe1]$^{2+}$ complex is shown to catalyze CO$_2$ reduction at extremely mild redox potentials ($\eta$=190 mV; −1.46 V vs Fc/Fc$^+$) relative to the control polypyridyl complexes.

The positive redox potentials for CO$_2$RR catalysis have been interpreted through extensive experimental spectroscopic (NMR, Mössbauer, and XAS), XRD, and electrochemical analysis that are illustrated in the Examples herein. The results, along with electronic structure calculations, collectively present a model in which the two-electron reduced iron complex, [Fe1]$^0$, possesses an open-shell singlet ground state electronic structure ([Fe(tpyPY2Me$^{••}$)$^{2-}$]$^0$) resulting from a strong intramolecular antiferromagnetic coupling between a triplet reduced ligand (tpyPY2Me tpyPY2Me$^{••2-}$; S$_{tpyPY2Me}$=1) and an intermediate-spin Fe(II) center (S$_{Fe}$=1).

The multielectron chemistry of [Fe1]$^{2+}$ at relatively positive potentials is facilitated through this electronic structure, which in turn promotes its exceptional selectivity (FE$_{CO}$>90%) through suppression of HER pathways. Furthermore, variable potential CPE experiments with direct product detection show that [Fe1]$^{2+}$ operates at fast rates in both organic (TOF>100 000$^{s-1}$) and aqueous electrolytes (TOF>50 000$^{s-1}$) with robust long-term stability and recyclability.

The ability to create molecular compounds with strong exchange coupling between synergistic, redox non-innocent ligands and metal centers has broad implications for catalyst design, including enabling control over the density and arrangement of functional active sites. Indeed, redox balancing through electronic delocalization is pivotal for biological and materials catalysts to achieve complex chemical transformations at or near thermodynamic potentials. However, discrete molecular compounds offer a level of tunability via coordination chemistry that remains unparalleled in protein design and nanostructure engineering. Thus, inorganic molecules are uniquely positioned to open access to a range of new properties and offer a desirable alternative strategy for lowering energy barriers for redox catalysis.

The technology described herein may be better understood with reference to the accompanying examples, which are intended for purposes of illustration only and should not be construed as in any sense limiting the scope of the technology described herein as defined in the claims appended hereto.

Example 1

To demonstrate the synthesis methods, the iron polypyridine complex [Fe1]$^{2+}$ (i.e., [Fe-(tpyPY2Me)(CH$_3$CN)]$^{2+}$) was prepared and characterized. The general procedure is shown sequentially in FIG. 6.

Initially, 6-Bromo-2,2':6'2''-terpyridine was synthesized by combining 6-Bromo-2,2'-bipyridine (3.58 g, 15.26 mmol) and Pd(PPh$_3$)$_4$ (0.88 g, 0.76 mmol) and loaded into an oven dried 500 mL Schlenk flask equipped with a stir bar. The reaction flask was evacuated and refilled with Ar (3×). Next, anhydrous 1,2-dimethoxyethane (DME) (300 mL) and hexamethylditin (3.16 mL) were added to the reaction mixture. The reaction was then heated at 80° C. overnight. The reaction mixture was then allowed to cool to RT and concentrated under vacuum.

The crude 6-(trimethylstannyl)-2,2'-bipyridine solution was vacuum dried and later mixed with 2,6-dibromopyridine (3.61 g, 15.26 mmol), LiCl (1.29 g, 30.52 mmol), and Pd(PPh$_3$)$_4$ (0.88 g, 0.76 mmol) under an Ar atmosphere. The reaction mixture was later degassed with Ar (3×) and then dry toluene (300 mL) was added to the reaction flask and stirred at reflux for 24 hours, cooled to RT and concentrated under reduced pressure.

The crude product was purified by column chromatography starting with pure DCM and slowly ramping to 5% MeOH on SiO$_2$. The resulting product was further recrystallized in hot DMC and washed repeatedly with hexanes until the filtrate was clear. The final pure product was isolated as a white solid (1.40 g, 30% yield).

The 6-Bromo-2,2':6'2''-terpyridine was then used to produce 6-(1,1-di(pyridin-2-yl)ethyl)-2,2':6',2''-terpyridine (tpyPY2Me) ligand. Here, 5 mL of dry THF was added to 2,2'-(ethane-1,1-diyl) dipyridine (0.18 g, 0.96 mmol, 0.18 mL) in an oven dried flask and the reaction mixture was then cooled to −78° C. $^n$BuLi (2.5 M, hexanes) (0.05 g, 0.96 mmol, 0.38 mL) was slowly added to the reaction solution resulting in an immediate color change to bright red. The reaction was allowed to stir for 30 min at −78° C.

In a separate flask, dry THF (3 mL) was added to 6-bromo-2,2':6',2''-terpyridine (0.20 g, 0.64 mmol) and the solution was stirred until 6-bromo-2,2':6',2''-terpyridine was fully dissolved. After 30 min, the 6-bromo-2,2':6',2''-terpyridine solution was slowly added by syringe to the reaction mixture at −78° C. The reaction was allowed to stir for 1 hour at −78° C. then slowly warmed up to RT. Upon warming to ambient temperature, the reaction color turned dark red. The reaction was allowed to stir at RT for 24 h and then the reaction was quenched with 60 mL water. The organic and aqueous layers were separated. The aqueous layer was washed with DCM (3×, 20 mL), dried over MgSO$_4$, and concentrated to give a yellow-orange oil as a crude product. The crude oil was purified by column chromatography SiO$_2$:EtOAc (the crude product was loaded onto the column in a minimal amount of DCM). The pure ligand was obtained as a crystalline white solid (0.43 g, 81% yield).

Finally, the [Fe(tpyPY2Me)(CH$_3$CN)][OTf]$_2$ was produced by placing tpyPY2Me (86.0 mg, 0.21 mmol) ligand in scintillation vial under N$_2$ and mixed with dry, degassed CH$_3$CN (9 mL) and stirred. In a second scintillation vial, Fe(OTf)$_2$ (73 mg, 0.21 mmol) was mixed with 9 mL dry, degassed CH$_3$CN and stirred until solubilized to produce an iron triflate solution. The iron triflate solution was stirred at RT until fully solubilized. Once fully homogenous, the iron triflate solution was added to the stirring ligand solution resulting in the formation of a dark red solution and stirred at RT overnight, concentrated under vacuum and washed with pentanes (2 mL, 3×). The crude iron complex was purified by crystallization by slow vapor diffusion of diethyl ether (Et$_2$O) into a saturated CH$_3$CN solution which resulted in dark red block shaped X-ray diffraction quality crystals over the course of 3 to 5 days (158 mg, 98% yield).

Example 2

Figure 7A:
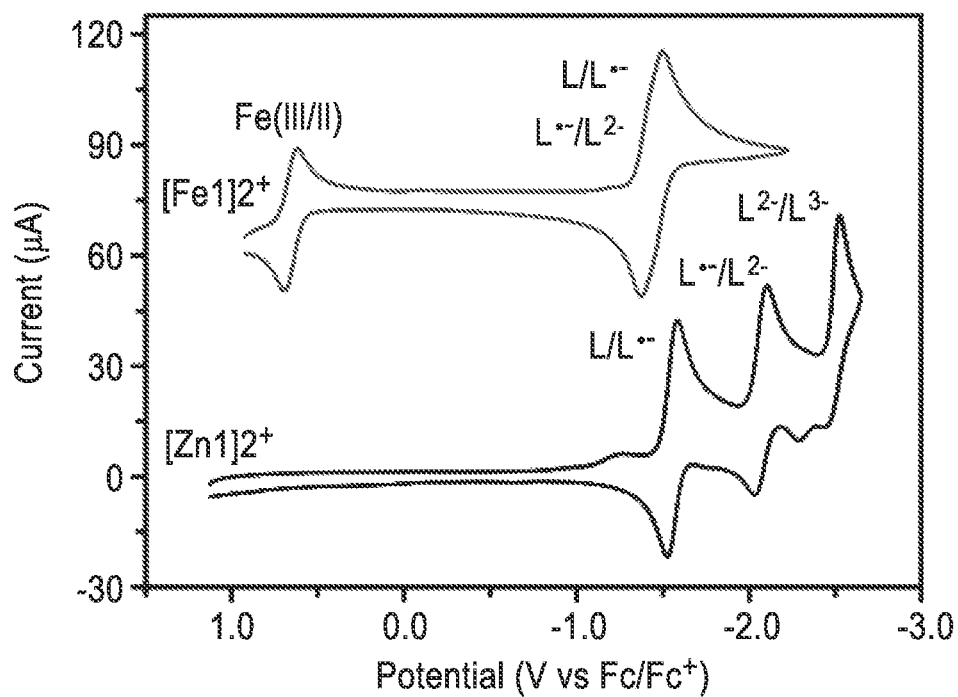
FIG. 7A are cyclic voltammograms collected under Ar of [Fe1]$^{2+}$ (upper trace) and [Zn1]$^{2+}$ (lower trace) complexes for electrochemical characterization.
Figure 7B:
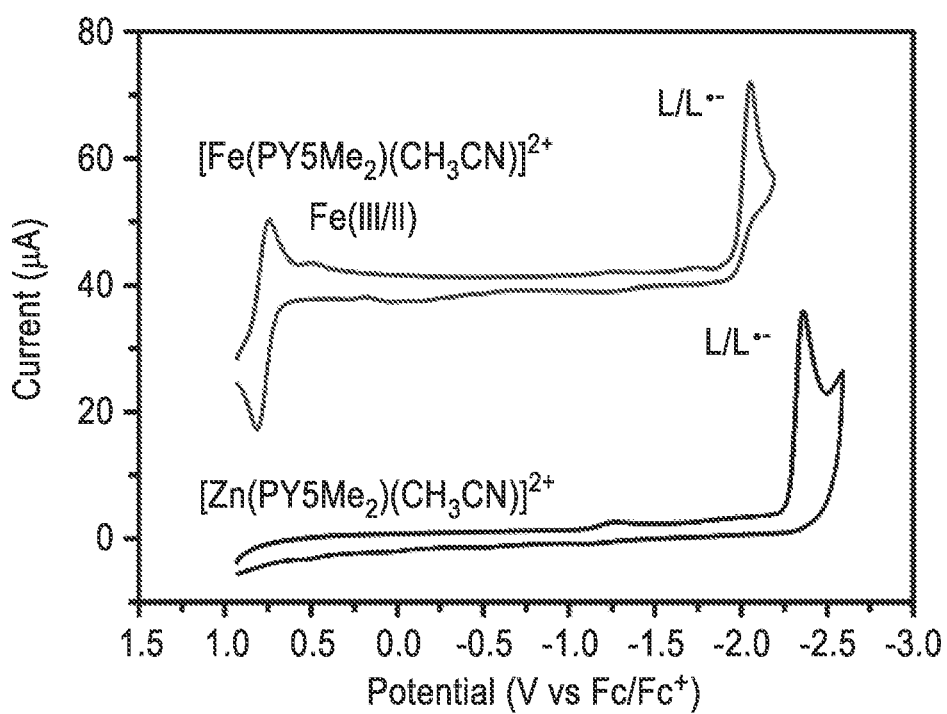
FIG. 7B are cyclic voltammograms of [Fe(PY5Me$_2$)(CH$_3$CN)]$^{2+}$ (upper trace) and [Zn(PY5Me$_2$)(CH$_3$CN)]$^{2+}$ (lower trace) complexes supported by redox-innocent PY5Me$_2$. These data show that the unique combination of Fe and redox non-innocent tpyPY2Me ligand leads to electrochemically reversible two-electron chemistry, with the Zn-tpyPY2Me analog exhibiting two reversible one-electron reduction waves with the second reduction at potentials that were 640 mV more negative than the iron analog. The Fe(II) and Zn(II) PY5Me$_2$ analogs both exhibit irreversible electrochemical reductions at potentials more negative than −2.0V vs Fc/Fc$^+$.

For electrochemical characterization of the catalyst, cyclic voltammetry of tpyPY2Me Fe(II) and Zn(II) complexes was performed and compared to PY5Me$_2$ analogs that were lacking the redox non-Innocent terpyridine fragment. As shown in FIG. 7A, cyclic voltammograms were collected under Ar of the [Fe1]$^{2+}$ (upper) and [Zn1]$^{2+}$ (lower) complexes. Cyclic voltammograms were also collected under Ar of the Fe(II) and Zn(II) PY5Me$_2$ analog [Fe(PY5Me$_2$)(CH$_3$CN)]$^{2+}$ (upper) and [Zn(PY5Me$_2$)(CH$_3$CN)]$^{2+}$ (lower) complexes supported by redox-innocent PY5Me$_2$ as seen in FIG. 7B.

Figure 7C:
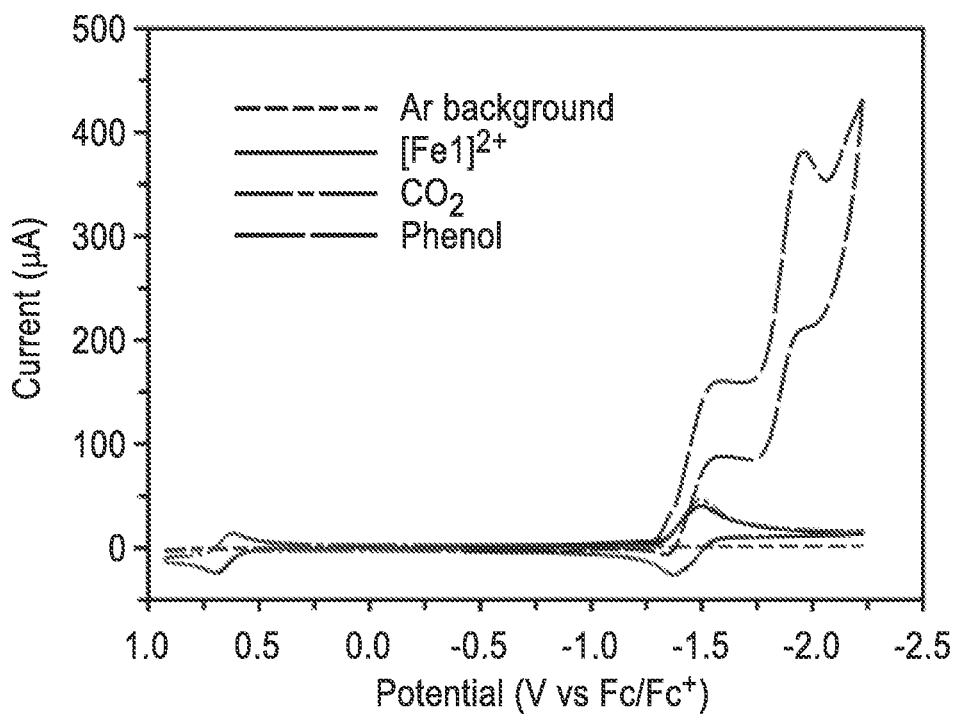
FIG. 7C is a cyclic voltammogram of [Fe1]$^{2+}$ collected under Ar, CO$_2$ and added phenol 3.5 M.
Figure 7D:
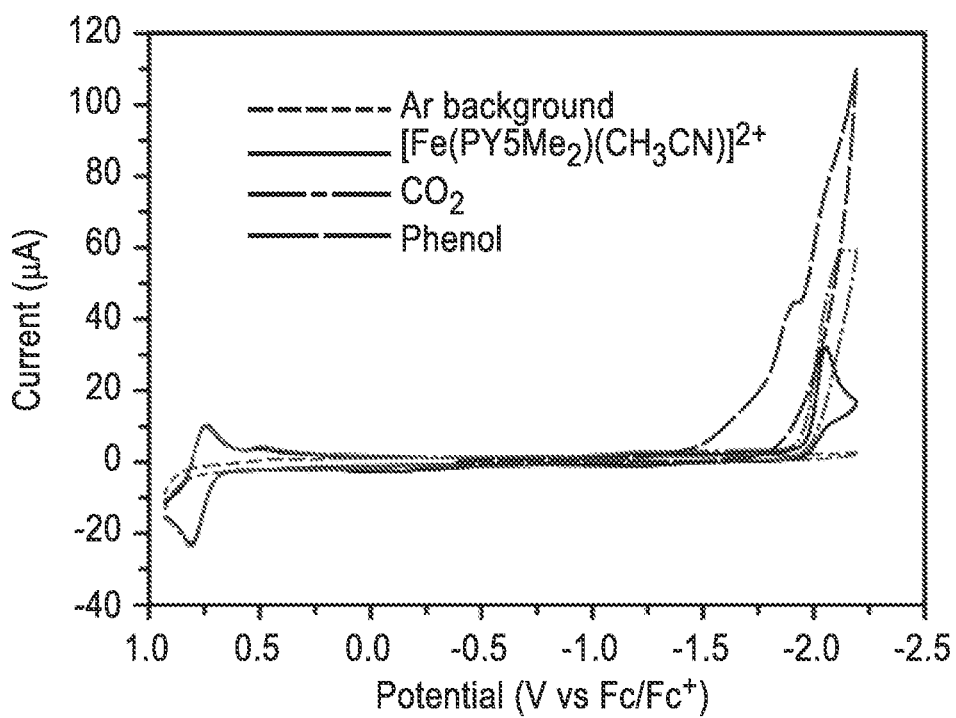
FIG. 7D is a cyclic voltammogram of cyclic [Fe (PY5Me$_2$)(CH$_3$CN)]$^{2+}$ collected under Ar, CO$_2$, with added phenol 3.5 M for comparison with [Fe1]$^{2+}$. Voltammograms were collected with a scan rate of 100 mV/s with an electrolyte of 0.10 M TBAPF$_6$ dissolved in CH$_3$CN.

Cyclic voltammograms of [Fe1]$^{2+}$ and [Fe(PY5Me$_2$)(CH$_3$CN)]$^{2+}$ collected under Ar and CO$_2$ with added phenol (3.5 M) are shown in FIG. 7C and FIG. 7D, respectively. Voltammograms were collected with a scan rate of 100 mV/s with an electrolyte of 0.10 M TBAPF$_6$ dissolved in CH$_3$CN.

The presence of a redox-active terpyridine moiety in tpyPY2Me also gives rise to unique electrochemical behavior for [Fe1]$^{2+}$ and [Zn1]$^{2+}$ relative to their PY5Me$_2$ analogues. The room temperature cyclic voltammogram (CV) of [Fe1]$^{2+}$ collected in CH$_3$CN under Ar exhibits three reversible features: a one electron oxidation at E½=0.66 V (versus Fc/Fc$^+$) assigned to the iron(III/II) couple and two, closely spaced, one-electron redox processes that are centered at −1.43 V as seen in FIG. 7A.

Further chemical characterization of this redox behavior indicates that these redox events are two sequential ligand-based reductions (tpyPY2Me$^{0/1-}$ and tpyPY2Me$^{1-/2-}$). During constant potential coulometry of 7.6×10-3 mmol of [Fe1]$^{2+}$ conducted at −1.60 V vs Fc/Fc$^+$ under Ar atmosphere, 1.58 C of charge was passed equating to 2.1 electrons per molecule of [Fe1]$^{2+}$, supporting this assignment as two closely spaced one-electron redox waves centered at −1.43 V vs Fc/Fc$^+$. No additional features were observed when scanning to more negative potentials.

In contrast, under the same conditions, the cyclic voltammogram of [Zn1]$^{2+}$ shown in FIG. 7A exhibits two, well-separated, reversible, one electron ligand-centered reductions with E$_{1/2}$ of −1.56 and −2.07 V as well as an additional irreversible redox event (tentatively assigned as tpyPY2Me$^{2-/3-}$) at −2.41 V. The first ligand centered reduction of [Zn1]$^{2+}$ occurs at a comparable potential to that of [Fe1]$^{2+}$ but the second ligand centered reduction is shifted 640 mV more negative and it is this disparate electrochemical behavior between [Fe1]$^{2+}$ and [Zn1]$^{2+}$ that indicates a degree of communication between the reduced tpyPY2Me ligand and the open-shell iron center that is not possible in the isostructural complex containing the closed-shell, redox-silent zinc center.

In contrast, ligand-based reductions in [Fe(PY5Me$_2$)(CH$_3$CN)]$^{2+}$ and [Zn(PY5Me$_2$)-(CH$_3$CN)]$^{2+}$ are electrochemically irreversible and occur at potentials negative of −2.0 V as seen in FIG. 4B, highlighting the crucial role of the terpyridyl fragment in achieving electrochemically reversible reduction events at relatively positive potentials.

Electrochemical reduction of $CO_2$ Catalyzed by $[Fe1]^{2+}$ and $[Fe(tpyPY2Me)]^{2+}$ in an organic solution are shown in FIG. 7C and FIG. 7D. Under an atmosphere of $CO_2$, CV data collected for $[Fe1]^{2+}$ exhibited only a subtle increase in current relative to scans under Ar. However, when excess phenol (3.5 M) was added as a proton source, two large catalytic waves appear at ca. −1.50 and −2.0 V versus $Fc/Fc^+$ as seen in FIG. 7C.

Similarly, the $PY5Me_2$ analog $[Fe(PY5Me_2)(CH_3CN)]^{2+}$ also displays catalytic currents upon addition of $CO_2$ and phenol, but the onset current for catalysis is >500 mV more negative than that observed for $[Fe1]^{2+}$ as shown in FIG. 7D. Phenol titrations conducted with solutions of $[Fe1]^{2+}$ under a $CO_2$ atmosphere revealed a dose-dependence on phenol concentration. The electrochemical response is mitigated when control phenol titrations were collected under an Ar atmosphere, suggesting that $[Fe1]^{2+}$ selectively catalyzes electrochemical $CO_2$ reduction ($CO_2RR$) over the hydrogen evolution reaction (HER), even at high concentrations of organic acid. As anticipated, it was observed that the isostructural Zn(II) analog $[Zn1]^{2+}$ does not show similar increases in catalytic current at such positive potentials, establishing that the redox non-innocent tpyPY2Me ligand alone with a Lewis acid center is not sufficient for promoting $CO_2RR$ activity.

Example 3

Figure 8A:
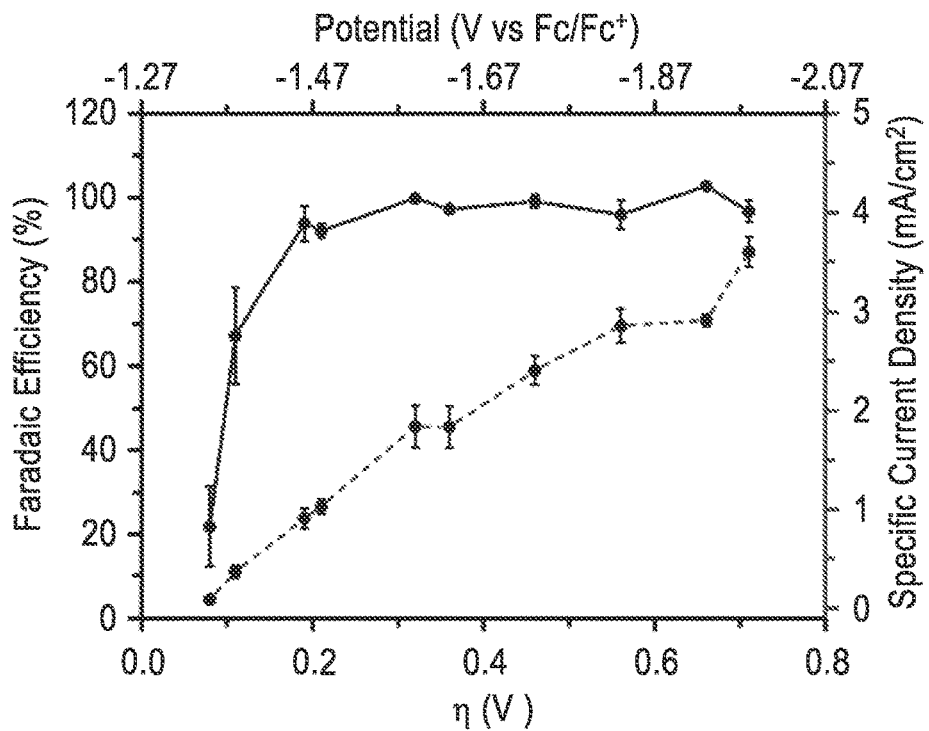
FIG. 8A is a graph showing the electrochemical CO$_2$ reduction performance of [Fe1]$^{2+}$ and the selectivity of [Fe1]$^{2+}$ for CO$_2$ reduction to CO at varying overpotentials and specific current densities for CO (j$_{CO}$) production (averages of three experiments).
Figure 8B:
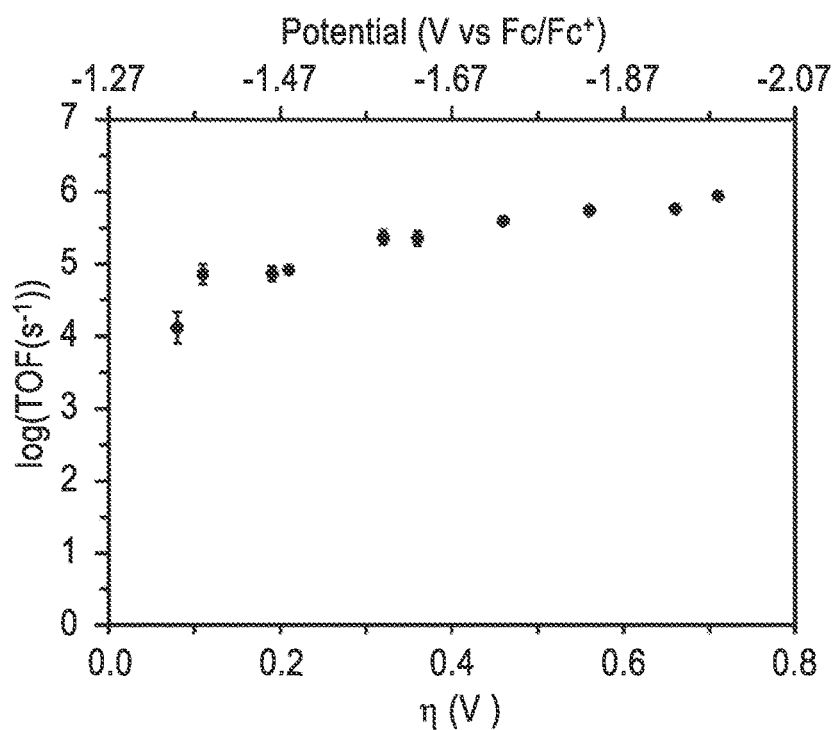
FIG. 8B is a catalytic Tafel plot for [Fe1]$^{2+}$ obtained from CPE experiments in acetonitrile with added phenol (3.5 M). CPE experiments were collected in an electrolyte of 0.10 M TBAPF$_6$ dissolved in CH$_3$CN.

To further characterize the catalysts, controlled potential electrolysis (CPE) studies were conducted for direct product measurements of electrochemical $CO_2RR$ catalyzed by $[Fe1]^{2+}$ in organic solution. The selectivity of $[Fe1]^{2+}$ for $CO_2$ reduction to CO at varying overpotentials and specific current densities for CO ($j_{CO}$) production (averages of three experiments) is shown in FIG. 8A. Catalytic Tafel plot for $[Fe1]^{2+}$ obtained from CPE experiments in acetonitrile with added phenol (3.5 M) is shown in FIG. 8B. CPE experiments were collected in an electrolyte of 0.10 M $TBAPF_6$ dissolved in $CH_3CN$.

Preparative-scale CPE experiments were conducted in $CO_2$-saturated acetonitrile with 3.5M phenol across a range of applied potentials (−1.35 to −1.98 V vs $Fc/Fc^+$), and the products were quantified by gas chromatography. It was observed that CO is the major product of the $CO_2RR$ reaction. It should also be noted that that subsequent turnover number and turnover rate values obtained are derived from the direct measurements of product, as opposed to indirect methods derived from transient CV currents with electrochemical assumptions.

Because the utility of a catalyst is benchmarked by its rate and overpotential (η), the applied potentials were also converted into overpotentials. Accurate conversion necessitates that the thermodynamic potential for $CO_2$ reduction to CO is known under the experimental conditions.

With the goal of increasing standardization and transparency in molecular electrocatalysis, the applied potentials from CPE experiments are reported in both overpotential and versus $Fc/Fc^+$ and use a conservative estimate $E_{CO2/CO}$ (−1.27 V vs Fc/Fc+) obtained from measured pKa values for acetonitrile-water mixtures. It should be noted that this value is 770 mV more positive than for "dry" acetonitrile and 70 mV more positive than the previously estimated standard redox potential for "wet" acetonitrile derived by assigning unusual gas standard states. Tafel plots that compare catalyst activity were plotted to show both the calculated overpotential as well as the directly measured potential versus the reference electrode used in the experiments (FIG. 8B). Reporting both values should lead to more clarity in benchmarking catalysts. $[Fe1]^{2+}$ is highly selective for $CO_2$ reduction over hydrogen evolution across the entire potential window examined, with averaged specific current densities for CO production ($j_{co}$) reaching as high as 3.6 $mA/cm^2$ as seen in FIG. 8A.

The Faradaic efficiency for CO production ($FE_{CO}$) reaches 94% at an overpotential of 190 mV (−1.46 V vs $Fc/Fc^+$) and increases to 100% with the application of overpotentials between 320 and 710 mV (−1.59 and ~1.98 V vs $Fc/Fc^+$) (FIG. 8A). This high activity and selectivity for CO production at applied potentials as low as −1.46 V vs $Fc/Fc^+$ is a substantial decrease in the energy requirements compared to other molecular catalysts and sits among the most efficient reported catalysts. Significantly, no CO and only small amounts of $H_2$ ($FE_{H2}$=44%) were detected in analogous CPE experiments with $[Fe(PY5Me_2)(CH_3CN)]^{2+}$ at much larger overpotentials. Moreover, variable potential CPE experiments with $[Zn1]^{2+}$ conducted between −1.66 V and −2.41 V vs $Fc/Fc^+$ produced only trace amounts of CO ($FE_{CO}$=1-6%) and a small amount of $H_2$ ($FE_{H2}$=1-20%), further illustrating the importance of metal-ligand cooperativity for efficient $CO_2RR$ catalysis.

Control experiments strongly supported the homogeneous molecular nature of $[Fe1]^{2+}$. First, $CO_2$ reduction was not observed in the absence of $[Fe1]^{2+}$. Furthermore, cyclic voltammetry and UV-vis data collected before and after 1 h CPE experiments are indistinguishable, attesting to the bulk stability of $[Fe1]^{2+}$ under electrolysis conditions.

Finally, the possible formation of an electrode-adsorbed active catalyst was excluded through a series of control experiments. First, peak currents for $[Fe1]^{2+}$ and $[Zn1]^{2+}$ were observed to scale linearly with the square root of the scan rate, indicative of freely diffusing species in solution. Second, CPE rinse tests which probe for electrode deposition, give complete inversion of product selectivity, with $H_2$ as the predominant product and negligible generation of CO.

Encouraged by the high selectivity of $[Fe1]^{2+}$ for electrochemical $CO_2RR$ over competing HER processes, the kinetic performance of $[Fe1]^{2+}$ was evaluated. Cyclic voltammograms acquired for $[Fe1]^{2+}$ under $CO_2$-saturated electrolyte in the presence of 3.5 M phenol exhibited scan rate dependence and noncanonical peak-shaped waves, indicative of competitive, nonideal processes (e.g., substrate consumption, product inhibition, etc.). As a result, $k_{obs}$ ($TOF_{max}$) obtained from catalytic plateau current analysis is not appropriate here and will lead to underestimations of the rates of $CO_2$ reduction.

Therefore, kinetic parameters were extracted directly from the variable potential CPE, where the products (CO and $H_2$) were detected and quantified by gas chromatography. The observed rate constants ($k_{obs}$) at each applied potential were extracted from the averaged specific current density for CO production ($j_{CO}$) taken across the entire 1 h CPE experiments that were conducted in triplicate.

A catalytic Tafel plot was constructed from the CPE experiments with direct product quantification (FIG. 8B). Tafel analysis identifies $[Fe1]^{2+}$ as one of the most active molecular electrocatalysts reported to date with it achieving a turnover frequency (TOF) of $75,000^{s-1}$ at an applied overpotential as low as 190 mV (−1.46 V vs $Fc/Fc^+$) and reaching TOFs>$500\,000^{s-1}$ between overpotentials of 560-710 mV (−1.81 and −1.98 V vs $Fc/Fc^+$). Notably, this rapid, homogeneous $CO_2$ reduction catalysis is achieved without any modifications to the secondary coordination sphere to introduce hydrogen bond/proton-relay functionalities to break electronic scaling relationships.

Finally, to assess the long-term catalytic stability and recyclability of [Fe1]$^{2+}$, four consecutive 5-hour CPE experiments were conducted at −1.98 V (versus Fc/Fc$^+$), the highest potential investigated, without addition of fresh [Fe1]$^{2+}$ between each experiment. [Fe1]$^{2+}$ is remarkably stable with 221 C of charge passed over the 20-hour window without any loss in selectivity for CO (average FE$_{CO}$=87%).

Example 4

The observed electrocatalytic efficiency of [Fe1]$^{2+}$ for CO$_2$RR is believed to stem from a synergistic effect between the iron center and the redox-active tpyPY2Me ligand, as both components are necessary to achieve selective CO$_2$RR reactivity. To establish a molecular-level framework for understanding this metal-ligand cooperativity, the two-electron reduced complex, [Fe(tpyPY2Me)]$^0$ "[Fe1]$^{0}$" was synthesized, isolated, and characterized to demonstrate its catalytic relevance.

Figure 9A:
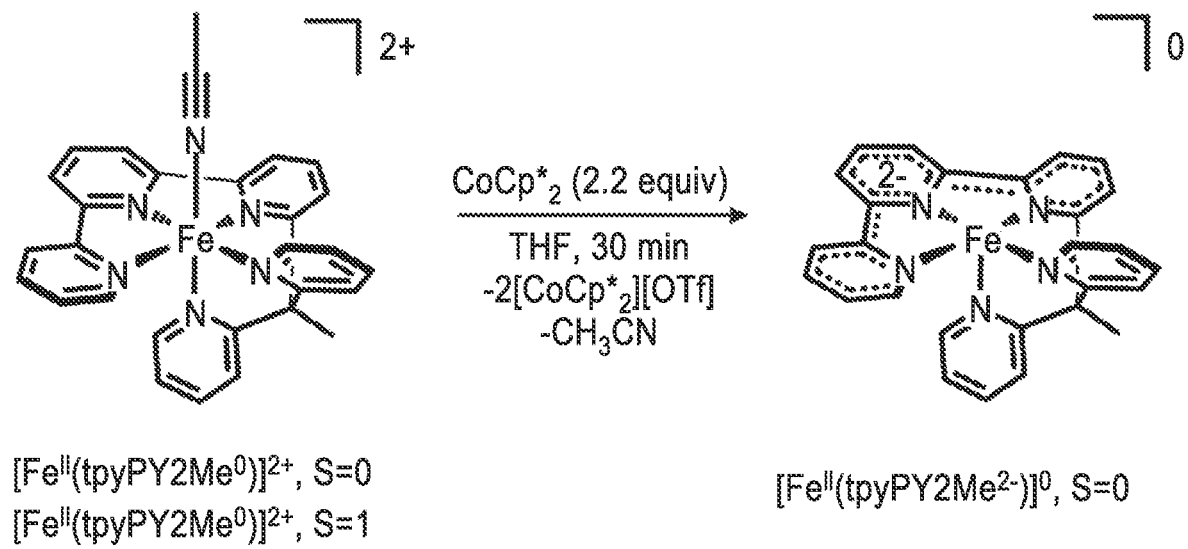
FIG. 9A shows the synthetic preparation and characterization of the two-electron reduced species [Fe1]$^0$. The collective structural and spectroscopic data support assignment to an open-shell singlet species that maintains a formal Fe(II) oxidation state. Two-electron reduction of [Fe1]$^{2+}$ generates the [Fe1]$^0$ complex that is a putatively active species for CO$_2$ reduction.
Figure 9B:
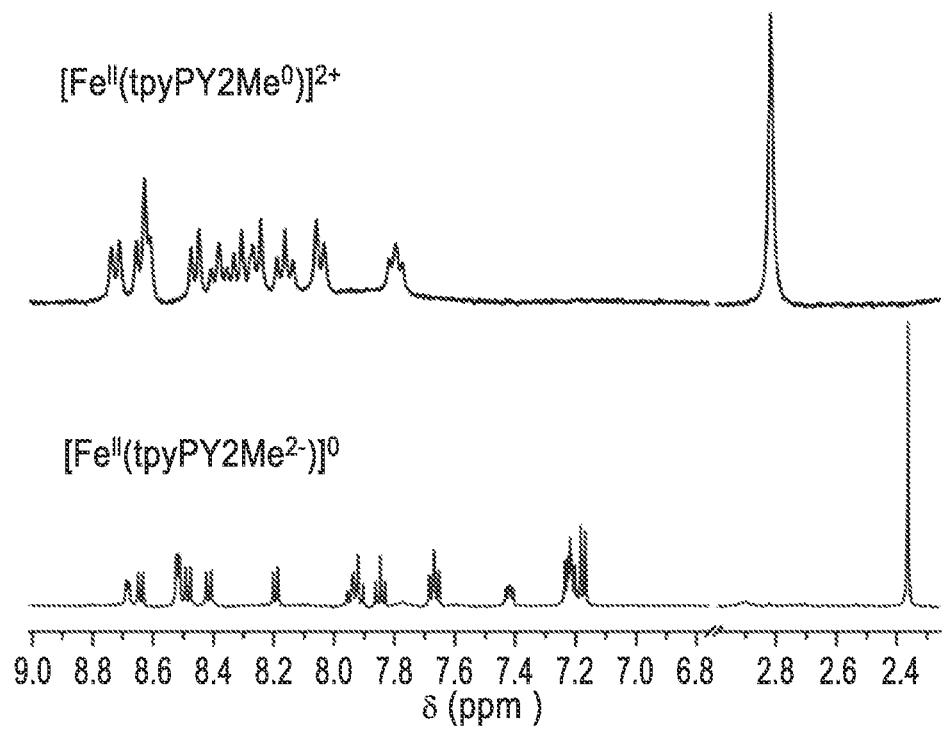
FIG. 9B is a $^1$H NMR spectrum of [Fe1]$^{2+}$ (upper) and 1H NMR spectrum of the product resulting from chemical reduction of [Fe1]$^{2+}$ with CoCp*$_2$ (lower). Both spectra were in CD$_3$CN at room temperature.

The chemical reduction of [Fe1]$^{2+}$ with 2.2 equivalents of decamethylcobaltocene is shown in FIG. 9A and produced [Fe1]$^0$ as a dark purple solid. As seen in FIG. 9B, the room temperature $^1$H NMR analysis of [Fe1]$^0$ in CD$_3$CN revealed that the compound is diamagnetic with the aryl and aliphatic signals shifted upfield. In support of this result, a nearly identical $^1$H NMR spectrum was obtained for the product [Zn1]$^0$ generated from the chemical reduction of [Zn1]$^{2+}$ with potassium graphite. The results depicted in FIG. 9B confirm the assignment of the reduction features for both [Fe1]$^{2+}$ and [Zn]$^{2+}$ as ligand-centered events.

Figure 10:
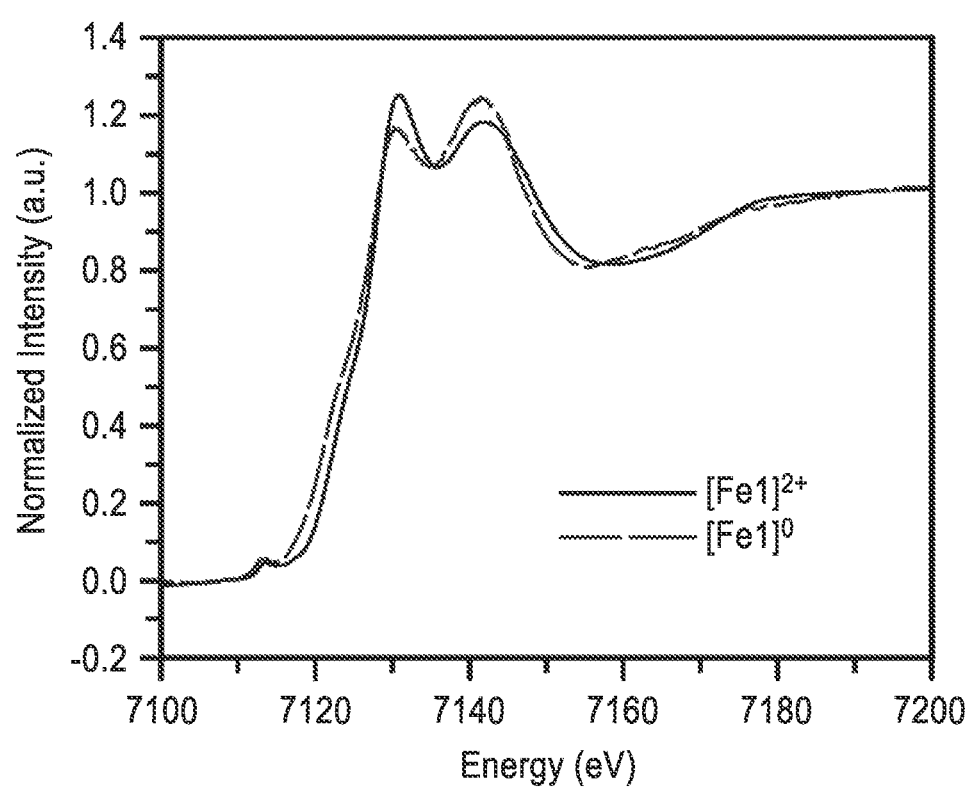
FIG. 10 is a graph of Fe K-edge XAS spectra of [Fe1]$^{2+}$ (solid) and two-electron reduced [Fe1]$^0$ (dashed), supporting a formal Fe(II) oxidation state assignment for both species.

Frozen solution Fe K-edge Xray absorption near-edge spectroscopy (XANES) was used to characterize metal oxidation states as shown in FIG. 10. The Fe K-edge XAS spectra of [Fe1]$^{2+}$ (solid) and two-electron reduced [Fe1]$^0$ (dashed) supports the formal Fe(II) oxidation state assignment for both species. Absorption edge energies were determined from the second derivative zero crossings, giving the values (eV): 7126.9 ([Fe1]$^0$) and 7127.4 ([Fe1]$^{2+}$). These values are similar to compounds in the literature leading to the assignment of the oxidation states of both species as Fe(II).

Given the unique diamagnetic ground state of [Fe1]$^0$, two major electronic structures are possible. The first possibility is a low-spin iron(II) center (S$_{Fe}$=0) coordinated to a reduced closed-shell singlet ligand (S$_{tpyPY2Me}$=0) generated by both electrons occupying the same π* orbital (i.e., [Fe-(tpyPY2Me)$^{2-}$]$^0$). The other possibility is an intermediate spin iron(II) center (S$_{Fe}$=1) antiferromagnetically coupled to a reduced ligand with an open-shell triplet configuration (S$_{tpyPY2Me}$=1) through half occupation of both low-lying π* terpyridine orbitals, leading to an overall metal-ligand spin-coupled electronic structure (i.e., [Fe(tpyPY2Me$^{\bullet\bullet}$)$^{2-}$]$^0$). The two electronic configurations are more clearly distinguished here by specifying the spin state of the ligand as either a singlet (tpyPY2Me)$^{2-}$ or a triplet (tpyPY2Me$^{\bullet\bullet}$)$^{2-}$ in the chemical formula. Because of the large anodic shift (640 mV) observed in the ligand-based reductions of [Fe1]$^{2+}$ relative to [Zn1]$^{2+}$ (FIG. 7A), the electrochemistry indicates a strong influence of the metal center and supports assignment to a [Fe-(tpyPY2Me$^{\bullet\bullet}$)$^{2-}$]$^0$ electronic configuration.

Figure 9C:
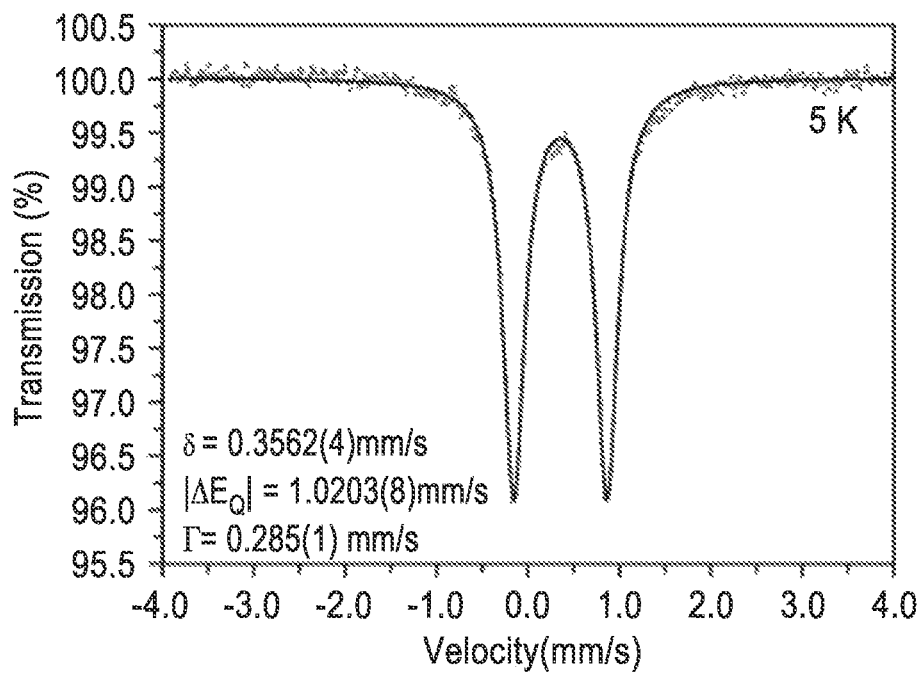
FIG. 9C is a Zero-field Fe Mössbauer analysis of [Fe1]$^{2+}$ measured at 5 K.
Figure 9D:
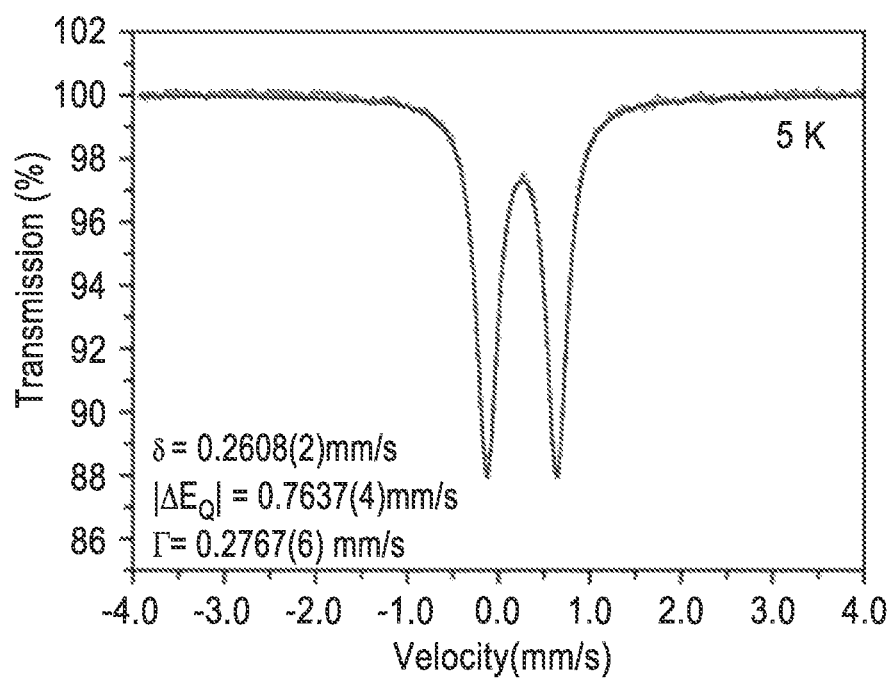
FIG. 9D is a Zero-field Fe Mössbauer analysis of [Fe1]$^0$ measured at 5 K.

In further support of this model, Mössbauer data for [Fe1]$^0$ revealed an isomer shift of δ=0.2608(2) mm/s and a quadrupole splitting of |E$_Q$|=0.7637(4) mm/s, consistent with the formation of intermediate-spin iron(II) as shown in FIG. 9C and FIG. 9D. The antiferromagnetic coupling between the reduced biradical ligand, (tpyPY2Me$^{\bullet\bullet}$)$^{2-}$, and the intermediate-spin iron(II) is expected to be quite strong given that a diamagnetic $^1$H NMR spectrum is observed at room temperature. Indeed, DFT calculations predicted a large coupling constant of −1023 cm$^{-1}$, giving rise to a singlet-quintet gap of 4400 cm$^{-1}$.

Further insights into the electronic structure of [Fe1]$^0$ can be gleaned from solid-state structures calculated for [Fe1]$^0$. Single crystals of [Fe1]$^0$ were obtained by slow evaporation of a saturated acetonitrile solution, and X-ray diffraction analysis revealed a distorted square pyramidal geometry resulting from the loss of the axial acetonitrile ligand in [Fe1]$^{2+}$. This structure is in good agreement with the reduction pathway predicted by DFT. The bond metrics of the terpyridine moiety unambiguously supports the two-electron reduction of the tpyPY2Me ligand in the solid state as well as the iron(II) oxidation state assignment.

In particular, the contraction of the intra-pyridine bond lengths (C$_{py}$–C'$_{py}$), from an average of 1.474(3) Å in [Fe1]$^{2+}$ to 1.434(4) Å in [Fe1]$^0$ is consistent with the metrics with which the oxidation levels of terpyridine can be established as determined through prior structural studies on a series of iron(II) and chromium(III) bis-terpyridine complexes. Furthermore, average C—N bond lengths of the terpyridine moiety in [Fe1]$^0$ (1.384(3) Å) depart quite significantly from what would be expected for typical, neutral aromatic pyridine rings (1.35±0.1 Å, respectively) and what was observed in the solid-state structure of [Fe1]$^{2+}$ (1.353(2) Å).

Although absolute determination of the electronic structure should not be based solely on X-ray diffraction, when it is taken together with the electrochemical, NMR, and Mössbauer results, the collective data support the iron(II) oxidation state assignment of [Fe1]$^0$ as an open-shell singlet ground state ([Fe(tpyPY2Me$^{\bullet\bullet}$)$^{2-}$]$^0$) composed of an intermediate-spin iron(II) center (S$_{Fe}$=1) that is antiferromagnetically coupled to a doubly reduced tpyPY2Me (S$_{tpy}$=1) ligand.

This strong exchange coupling shifts the tpyPY2Me-based reductions of [Fe1]$^{2+}$ to more positive potentials relative to the analog with the redox-silent Zn(II) center by 640 mV, which ultimately promotes highly selective CO$_2$ reduction by [Fe1]$^{2+}$.

Example 5

To further elucidate the electronic structures of [Fe1]$^{2+/0}$, DFT calculations using the ωB97X-D functional were used to generate a more accurate molecular orbital picture of the [Fe1]$^{2+}$ system. Optimized structures and predicted redox potentials for [Fe1]$^{2+}$ and [Zn1]$^{2+}$ were in good agreement with previously acquired experimental data.

Figure 11A:
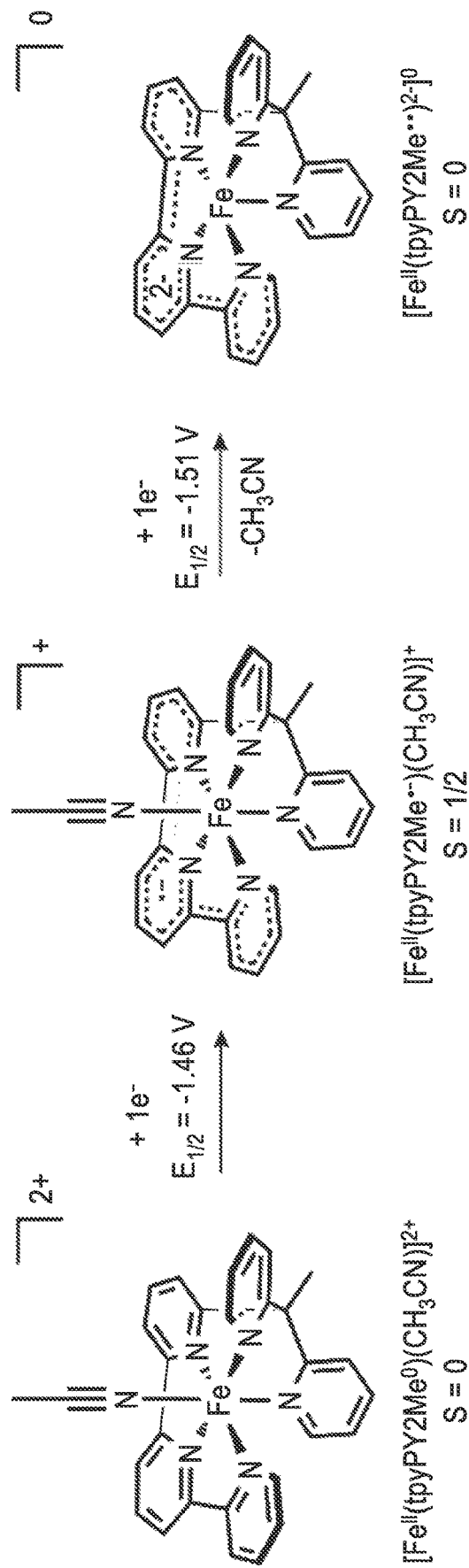
FIG. 11A is the density functional theory (DFT) predicted pathway for reduction of [Fe1]$^{2+}$ to the open-shell singlet [Fe1]$^0$ and [Fe(tpyPY2Me$^{\bullet\bullet}$)$^{2-}$]$^0$. The computed reduction potentials are given for reduction of [Fe1]$^{2+}$ to [Fe1]$^+$ and [Fe1]$^+$ to [Fe1]$^0$.

The DFT predicted pathway for reduction of [Fe1]$^{2+}$ to the open-shell singlet [Fe1]$^0$, [Fe(tpyPY2Me$^{\bullet\bullet}$)$^{2-}$]$^0$ is shown in FIG. 11A. The computed reduction potentials are given for reduction of [Fe1]$^{2+}$ to [Fe1]$^+$ and [Fe1]$^+$ [Fe1]$^0$. A simplified molecular orbital diagram of the one electron reduced intermediate [Fe1]$^+$ is shown in FIG. 11B and a simplified molecular orbital diagram of [Fe1]$^0$ is shown in FIG. 11C.

Figure 11B:
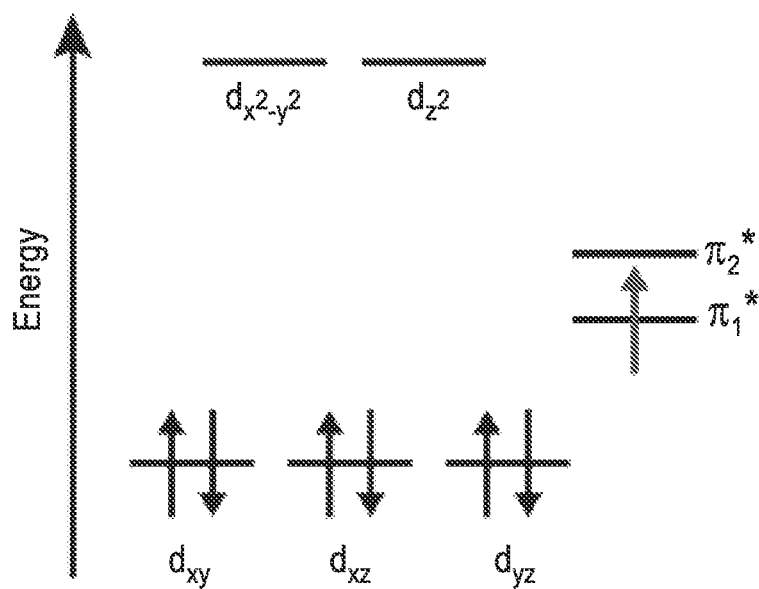
FIG. 11B is a simplified molecular orbital diagram of the one electron reduced intermediate [Fe1]$^+$.
Figure 11C:
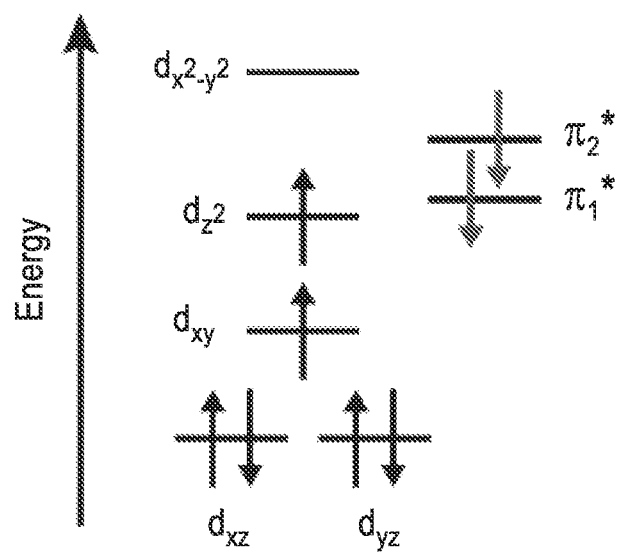
FIG. 11C is a simplified molecular orbital diagram of [Fe1]$^0$ ([Fe(tpyPY2Me$^{\bullet\bullet}$)$^{2-}$]$^0$).

As shown in FIG. 11A to FIG. 11C, the first reduction of [Fe1]$^{2+}$ to [Fe1]$^+$ is predicted to generate a ground state doublet composed of a low spin iron(II) and a tpyPY2Me-based radical (tpyPY2Me$^{\bullet}$)$^{1-}$ with a predicted redox potential of −1.46V. The spin density plot of this [Fe1]$^+$ species indicates a ligand-based reduction with almost no excess spin on the iron center. The second reduction populates a second low lying π* orbital of tpyPY2Me and induces the loss of the axial acetonitrile molecule, providing access to an intermediate-spin iron(II) state as seen in FIG. 11A to FIG. 11C. The $S_{Fe}=1$ iron center is strongly antiferromagnetically coupled to the two electrons in the tpyPY2Me π* orbitals (i.e., [Fe(tpyPY2Me⋅⋅)$^{2-}$]$^0$.

Localized orbital bonding analysis confirmed that iron remains in the 2+ oxidation state during the second reduction process, which has a predicted reduction potential of −1.51 V. This predicted redox potential is in good agreement with what was observed experimentally.

In addition, multi-reference calculations using complete active space self-consistent field (CASSCF) confirmed the antiferromagnetically coupled ground state. Calculations reveal a strong entanglement of the two ligand-based orbitals and the two-metal d-orbitals. In particular, the axial distortion away from octahedral symmetry allows the $d_{z^2}$ and $d_{xy}$ metal orbitals (or superposition of the two orbitals) to interact with the two tpyPY2Me π* orbitals in a weak r-type interaction.

Hence, the novel ligand framework with two low-lying π* orbitals, a distorted coordination geometry, and a moderate ligand field in combination with the iron metal center stabilizes two excess electrons effectively. The spin transition alters both the energetics of the d-orbitals and local spin on the central metal to facilitate an effective antiferromagnetic coupling. In contrast, in the alternative closed-shell singlet electronic configuration ([Fe(tpyPY2Me)$^{2-}$]$^0$; $S_{Fe}=0$ and $S_{tpy}=0$), the stabilization of the doubly reduced tpyPY2Me π* ($S_{tpy}=0$) by the high lying eg* of the low-spin iron(II) ($S_{Fe}=0$) is marginal. This feature is illustrated by the almost identical second ligand reduction potentials of [Zn1]$^{2+}$ and [Fe1]$^{2+}$ with a closed-shell singlet electronic structure (−2.02 V for [Zn1]$^{2+}$ and −2.03 V vs Fc/Fc$^+$ for [Fe1]$^{2+}$ with $S_{Fe}=0$ and $S_{tpy}=0$).

Example 6

Figure 12A:
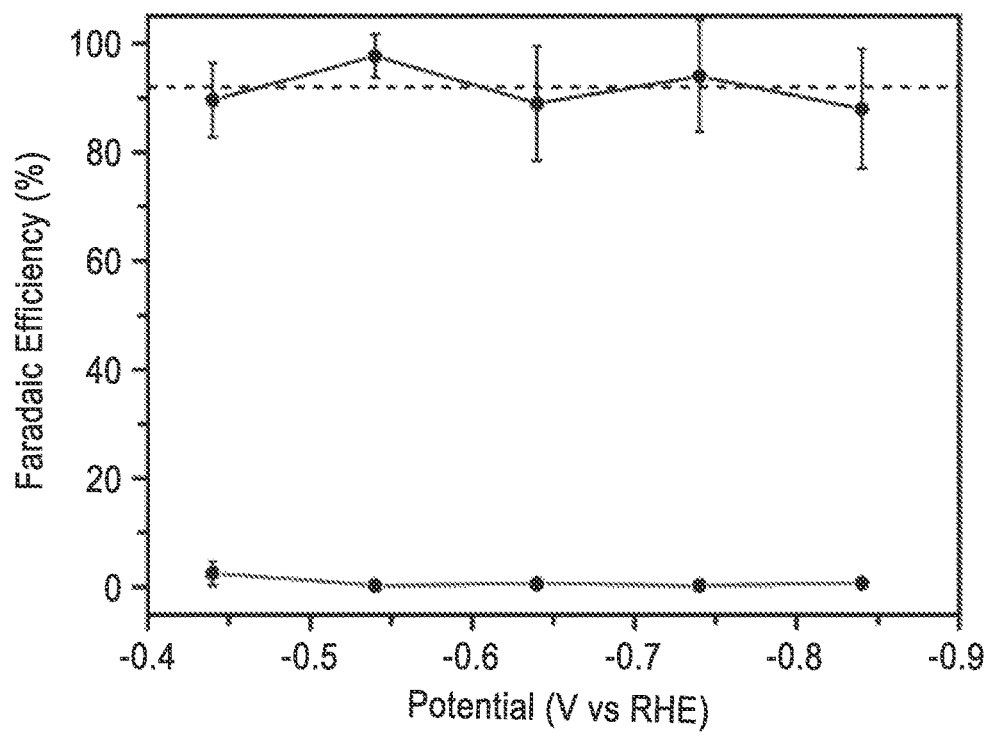
FIG. 12A depicts the aqueous CO$_2$ reduction performance for the Fe-tpyPY2Me electrocatalyst with Faradaic efficiencies for CO (upper) and H$_2$ (lower) formation at varying applied potentials for 60 min (averages of three experiments). The average FE$_{CO}$ is indicated by the dashed line.

The versatility of the catalysts was demonstrated further with electrochemical CO$_2$RR catalyzed by [Fe1]$^{2+}$ in water. Given the observed low overpotentials required for [Fe1]$^{2+}$ to catalyze homogeneous electrochemical CO$_2$ reduction in an organic solvent, the activity of the catalysts was demonstrated in water. The Faradaic efficiencies for CO and H$_2$ formation at varying applied potentials for 60 min (averages of three experiments) is shown in FIG. 12A. The average FE$_{CO}$ is indicated by the dashed line.

In this example, the more water-soluble nitrate analog of [Fe1]$^{2+}$ was prepared, and X-ray diffraction analysis revealed that anion exchange does not alter the catalyst structure. The nitrate analog of [Fe1]$^{2+}$ was prepared by dissolving tpyPY2Me (100 mg, 0.21 mmol) ligand in acetone (2 mL) in a flask. Then, Fe(NO$_3$)$_3$·9H$_2$O (97.2 mg, 0.24 mmol) was weighed into a second flask and dissolved in water (1 mL). The iron nitrate solution was then added dropwise into the ligand solution resulting in the formation of an orange solution that turned to dark red over the course of a few minutes. The reaction was stirred at RT overnight. The following day the crude reaction solution was concentrated under vacuum. The crude iron complex was purified by crystallization by slow vapor diffusion of Et$_2$O into a saturated methanolic solution which resulted in black plate-shaped X-ray diffraction quality crystals over the course of 1-2 days (116 mg, 81% yield).

As a cheap, abundant, and benign solvent and proton source, water is an attractive medium for CO$_2$ reduction. However, homogeneous molecular CO$_2$ reduction catalysts typically require mercury working electrodes to operate effectively in aqueous electrolytes because their onset potentials are too negative to be compatible with more desirable carbon-based electrodes that preferentially catalyze competing water reduction.

The 640 mV positive shift in 2-electron reduction potential observed upon moving from Zn(II) to Fe(II) suggested that CO$_2$RR would be favored over HER, even with water as both a solvent and proton source. Against this backdrop, it was observed that cyclic voltammograms collected for [Fe1]$^{2+}$ dissolved in 0.10 M NaHCO$_3$ with a carbon paste working electrode show the formation of a catalytic wave when saturated with CO$_2$.

Figure 12B:
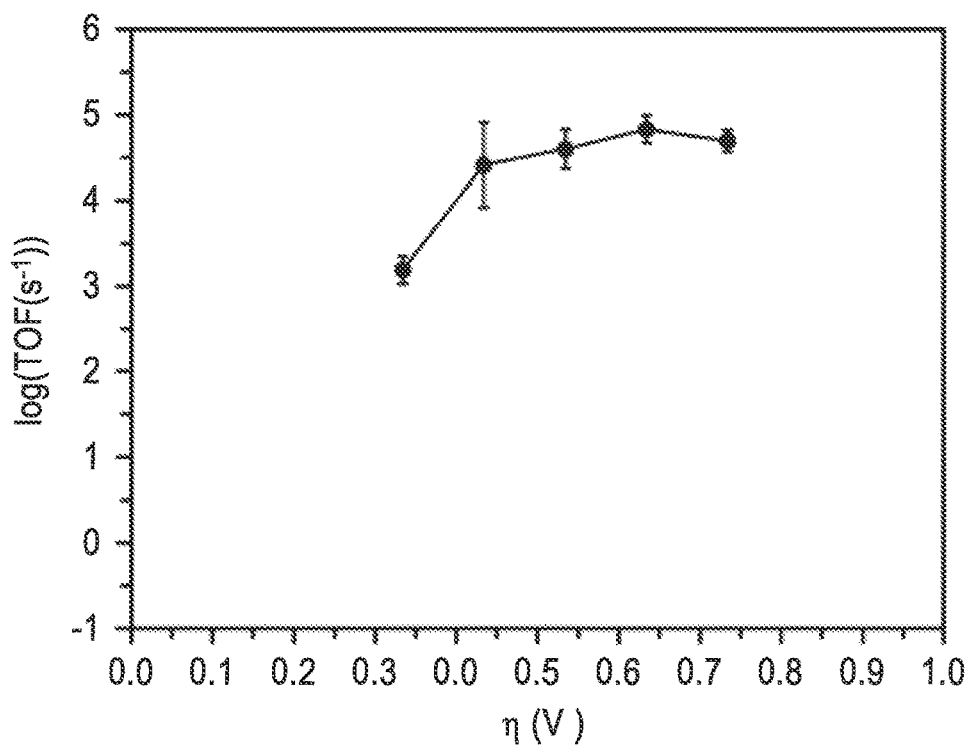
FIG. 12B is a catalytic Tafel plot for [Fe1]$^{2+}$ obtained from CPE experiments in 0.10 M NaHCO$_3$.

A catalytic Tafel plot for [Fe1]$^{2+}$ obtained from CPE experiments in 0.10 M NaHCO$_3$ is shown in FIG. 12B. It is notable that the variable potential CPE experiments revealed that [Fe1]$^{2+}$ maintains its activity and selectivity for CO$_2$ reduction to CO in water (average FE$_{CO}$=92% and FE$_{H2}$<1%) with maximum turnover frequencies, determined from direct product detection, reaching >50 000$^{s-1}$ at overpotentials of 500 mV. Importantly, control rinse tests passed negligible current during 1 h CPE experiments, and the selectivity was inverted such that H$_2$ is the major product.

In addition, UV-visible spectra collected before and after electrolysis are nearly indistinguishable. However, cyclic voltammograms changed quite drastically following the 1 h CPE indicative of some degree of catalyst deposition and decomposition on the glassy carbon electrode. In line with this observation, electrochemical stripping behavior was also observed, which may contribute to slower catalysis in water relative to organic solvent. Nevertheless, these data show that [Fe1]$^{2+}$ is an effective molecular catalyst for homogeneous CO$_2$ reduction in water. Crucially, given its molecular nature, the activity, stability, and overpotential of this catalyst can in principle be tuned through ligand modifications accessible by synthetic chemistry. Further, the study of this catalyst and related systems has the potential to shed important insights on the behavior of materials catalysts bearing atomically dispersed iron sites.

From the description herein, it will be appreciated that the present disclosure encompasses multiple embodiments of the technology which include, but are not limited to, the following:

A metal coordination complex catalyst, comprising: (a) a metal; and (b) a tpyPY2Me ligand represented by formula (1): wherein each substituent lettered A to S of the ligand is independently selected from the group of substituents consisting of H, R, a halide, CF$_3$, OR, NR$_2$, and SiR$_3$, where R is an alkyl group or an aryl group.

The catalyst of any preceding or following embodiment, further comprising a counter ion selected from the group consisting of Cl, Br, I, PF$_6$, CH$_3$SO$_3$, and [(3,5-(CF$_3$)$_2$C$_6$H$_3$)$_4$B].

The catalyst of any preceding or following embodiment, wherein the metal comprises Fe forming an iron(II) complex [Fe(tpyPY2Me)]$^{2+}$.

The catalyst of any preceding or following embodiment, wherein each substituent lettered A to S comprises a hydrogen atom.

The catalyst of any preceding or following embodiment, wherein the substituents lettered A to S are independently selected from the group of substituents consisting of H, R, OR, NR$_2$, and SiR$_3$, where R is an alkyl group selected from methyl, ethyl, n-propyl, isopropyl, n-butyl, t-butyl, isobutyl, sec-butyl, pentyl, hexyl and cyclohexyl groups.

The catalyst of any preceding or following embodiment, wherein the substituents lettered A to S are independently substituents consisting of H, R, OR, $NR_2$, and $SiR_3$, where R is an aryl group selected from the group consisting of phenyl, naphthyl, pyridinyl, indolyl and 2-methyl-phenyl groups.

A metal coordination complex catalyst, comprising: (a) a metal; and (b) a ligand represented by formula (2), wherein: each substituent lettered A to S of the ligand is independently selected from the group of substituents consisting of H, R, a halide, $CF_3$, OR, $NR_2$, and $SiR_3$, where R is an alkyl group or an aryl group.

The catalyst of any preceding or following embodiment, further comprising a counter ion selected from the group consisting of Cl, Br, I, $PF_6$, $CH_3SO_3$, and $[(3,5\text{-}(CF_3)_2C_6H_3)_4B]$.

The catalyst of any preceding or following embodiment, wherein the metal comprises Fe.

The catalyst of any preceding or following embodiment, wherein each substituent lettered A to S comprises a hydrogen atom.

The catalyst of any preceding or following embodiment, wherein the substituents lettered A to S are independently selected from group of substituents consisting of H, R, OR, $NR_2$, and $SiR_3$, where R is an alkyl group selected from methyl, ethyl, n-propyl, isopropyl, n-butyl, t-butyl, isobutyl, sec-butyl, pentyl, hexyl and cyclohexyl groups.

The catalyst of any preceding or following embodiment, wherein the substituents lettered A to S are independently substituents consisting of H, R, OR, $NR_2$, and $SiR_3$, where R is an aryl group selected from the group consisting of phenyl, naphthyl, pyridinyl, indolyl and 2-methyl-phenyl groups.

A process for electrochemical $CO_2$ reduction, the process comprising: (a) providing an electrochemical cell with an electrolyte solution containing $CO_2$; and (b) applying an overpotential to the solution containing $CO_2$ in the presence of a metal coordination complex catalyst, the catalyst comprising: (i) a metal; and (ii) a polypyridine ligand selected from the group of ligands consisting of a tpyPY2Me ligand represented by formula (1) and a ligand represented by formula (2) wherein each substituent lettered A to S of the ligand of formula (1) and formula (2) is independently selected from group of substituents consisting of H, R, a halide, $CF_3$, OR, $NR_2$, and $SiR_3$, where R is an alkyl group or an aryl group; and wherein a $CO_2$ reduction reaction ($CO_2RR$) is favored over a hydrogen evolution reaction (HER).

The process of any preceding or following embodiment, wherein the solution is an organic solution or an aqueous solution.

The process of any preceding or following embodiment, wherein the catalyst further comprises a counter ion selected from the group consisting of Cl, Br, I, $PF_6$, $CH_3SO_3$, and $[(3,5\text{-}(CF_3)_2C_6H_3)_4B]$.

The process of any preceding or following embodiment, wherein the metal of the catalyst comprises a transition metal selected from the group consisting of Co, Ni, Cu and Zn.

The process of any preceding or following embodiment, wherein the metal of the catalyst comprises Fe forming an iron(II) complex $[Fe(tpyPY2Me)]^{2+}$.

The process of any preceding or following embodiment, wherein each substituent lettered A to S of the ligand comprises a hydrogen atom.

The process of any preceding or following embodiment, wherein the substituents lettered A to S of the ligand are independently selected from group of substituents consisting of H, R, OR, $NR_2$, and $SiR_3$, where R is an alkyl group selected from methyl, ethyl, n-propyl, isopropyl, n-butyl, t-butyl, isobutyl, sec-butyl, pentyl, hexyl and cyclohexyl groups.

The process of any preceding embodiment, wherein the substituents lettered A to S of the ligand are independently substituents consisting of H, R, OR, $NR_2$, and $SiR_3$, where R is an aryl group selected from the group consisting of phenyl, naphthyl, pyridinyl, indolyl and 2-methyl-phenyl groups.

As used herein, term "embodiment" is intended to include, without limitation, embodiments, implementations, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for."

What is claimed is:

1. A metal coordination complex catalyst, comprising:
   (a) a metal; and
   (b) a tpyPY2Me ligand represented by formula (1)

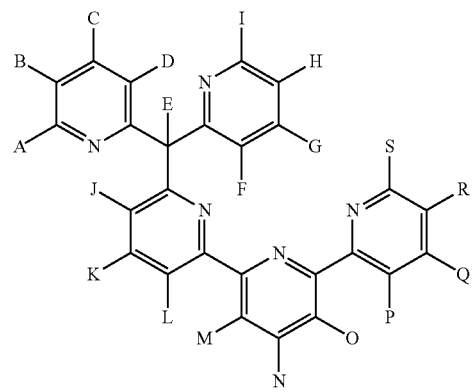

wherein each substituent lettered A to S of said ligand is independently selected from the group of substituents consisting of H, R, a halide, $CF_3$, OR, $NR_2$, and $SiR_3$, where R is an alkyl group or an aryl group.

2. The catalyst of claim 1, further comprising a counter ion selected from the group consisting of Cl, Br, I, $PF_6$, $CF_3SO_3$, and $[(3,5-(CF_3)_2C_6H_3)_4B]$.

3. The catalyst of claim 1, wherein said metal comprises Fe forming an iron(II) complex $[Fe(tpyPY2Me)]^{2+}$.

4. The catalyst of claim 1, wherein each substituent lettered A to S comprises a hydrogen atom.

5. The catalyst of claim 1, wherein said substituents lettered A to S are independently selected from the group of substituents consisting of H, R, OR, $NR_2$, and $SiR_3$, where R is an alkyl group selected from methyl, ethyl, n-propyl, isopropyl, n-butyl, t-butyl, isobutyl, sec-butyl, pentyl, hexyl and cyclohexyl groups.

6. The catalyst of claim 1, wherein said substituents lettered A to S are independently substituents consisting of H, R, OR, $NR_2$, and $SiR_3$, where R is an aryl group selected from the group consisting of phenyl, naphthyl, pyridinyl, indolyl and 2-methyl-phenyl groups.

\* \* \* \* \*